(12) United States Patent
Falk

(10) Patent No.: US 8,571,508 B2
(45) Date of Patent: Oct. 29, 2013

(54) METHOD AND WIDEBAND ANTENNA SYSTEM TO MINIMISE THE INFLUENCE OF INTERFERENCE SOURCES

(75) Inventor: Kent Falk, Göteborg (SE)

(73) Assignee: Saab AB, Linköping (SE)

( * ) Notice: Subject to any disclaimer, the term of this patent is extended or adjusted under 35 U.S.C. 154(b) by 106 days.

(21) Appl. No.: 13/384,156

(22) PCT Filed: Jul. 16, 2009

(86) PCT No.: PCT/SE2009/050905
§ 371 (c)(1),
(2), (4) Date: Jan. 13, 2012

(87) PCT Pub. No.: WO2011/008146
PCT Pub. Date: Jan. 20, 2011

(65) Prior Publication Data
US 2012/0115429 A1    May 10, 2012

(51) Int. Cl.
*H04B 1/10* (2006.01)
(52) U.S. Cl.
USPC ............. 455/296; 455/1; 455/501; 455/63.1; 455/226.1; 455/278; 375/316; 375/346; 375/347; 375/348
(58) Field of Classification Search
USPC ........... 455/1, 501, 63.1, 67.13, 67.16, 114.2, 455/135, 168.1, 226.3, 278.1, 296; 375/316, 346, 347, 348
See application file for complete search history.

(56) References Cited

U.S. PATENT DOCUMENTS

| | | |
|---|---|---|
| 4,044,359 A | 8/1977 | Applebaum et al. |
| 5,592,178 A | 1/1997 | Chang et al. |
| 6,115,409 A | 9/2000 | Upadhyay et al. |
| 6,624,783 B1 | 9/2003 | Rabideau |
| 2003/0025633 A1 | 2/2003 | Cai et al. |
| 2003/0179139 A1* | 9/2003 | Nemit et al. ............. 342/383 |
| 2006/0208945 A1 | 9/2006 | Kolanek |
| 2007/0040704 A1* | 2/2007 | Smee et al. ............. 340/981 |
| 2007/0098121 A1* | 5/2007 | Casabona et al. ......... 375/346 |
| 2007/0296625 A1 | 12/2007 | Bruzzone et al. |

FOREIGN PATENT DOCUMENTS

EP   0 141 441 A1   5/1985
EP   2088449 A1   8/2009

OTHER PUBLICATIONS

Extended European Search Report from the European Patent Office, issued on Dec. 4, 2012, in connection with counterpart European Application No. EP 09 84 7414.
Nyack, Cuthbert, "FIR Filters using the Fourier Series," *FIR Filters Using the Fourier Series*, Jan. 1, 2008.

(Continued)

*Primary Examiner* — Tuan Pham
(74) *Attorney, Agent, or Firm* — Venable LLP; Eric J. Franklin

(57) ABSTRACT

A method to minimize influence of interference sources by control of a signal to noise/interference ratio of a wideband antenna system connected to an electronic system. The wideband antenna system includes at least one array of at least two antenna elements/sub arrays. The signal to noise/interference ratio control includes establishing of cancellation directions for interfering frequencies in the antenna pattern in the direction of interference sources. The wideband antenna system is operational over a system bandwidth and operates with an instantaneous bandwidth. Estimation of interference source parameters is performed in an evaluation process. A wideband antenna system implementing the method.

19 Claims, 11 Drawing Sheets

(56) References Cited

OTHER PUBLICATIONS

PCT/ISA/210—International Search Report—Apr. 8, 2010.

PCT/ISA/237—Written Opinion of the International Searching Authority—Apr. 8, 2010.

* cited by examiner

METHOD AND WIDEBAND ANTENNA SYSTEM TO MINIMISE THE INFLUENCE OF INTERFERENCE SOURCES

CROSS-REFERENCE TO RELATED APPLICATIONS

This application is the national phase under 35 U.S.C. §371 of PCT/SE2009/050905 filed 16 Jul. 2009.

TECHNICAL FIELD

The invention relates to the field of interference on electronic systems such as jammer interference on radar systems.

BACKGROUND ART

It is often desirable to minimize the influence of interference sources and also to estimate characteristic parameters of interference sources disturbing an electronic system, such as jammers or unintentional Radio Frequency Interference (RFI) disturbing a radar or a communications system. Today a separate Side Lobe Cancelling system (SLC) is used to minimize the interference from interference sources and a separate ESM (Electronic Support Measurement) receiver is today normally used to estimate interference parameters from the interference sources. The ESM system is also used for other purposes. An alternative is that this function of estimating interference parameters is performed by the electronic system. Both alternatives limit the time available for the actual function of the electronic system as both solutions will occupy the antenna aperture of the electronic system during operation. Antenna availability is a critical factor in Multifunctional systems where an antenna aperture can be used by several systems as e.g. a radar system, ESM system and a communication system.

SLC systems are used to cancel e.g. jammer signals picked up in side lobes of a radar stystem. Existing solutions allow jammer signals from several jammer sources to be cancelled. One solution is described in U.S. Pat. No. 4,044,359 "Multiple Intermediate frequency side-lobe canceller". Side lobes are difficult to avoid when designing antennas and jammer signals can be picked up by these side lobes. As the jammer signals are often powerful they will cause interference with the signal from a target picked up in the main lobe even if the reception sensitivity of the side lobe is much below the reception sensitivity of the main lobe. The drawback with the existing SLC solutions of today is that only narrow band cancellation of the side lobe is possible. This is a serious problem as radar antennas are often operating over a very wide bandwidth while side lobe cancellation is only effective in a part of the operating bandwidth of the radar antenna. SLC systems can also be used in other applications as e.g. to minimise RFI interference on communication systems.

There is thus a need to accomplish an improved method and antenna system for minimizing the influence of interference sources over a wide bandwidth and optionally for estimating interference source parameters from e.g. jammers without the estimation causing interruption of neither the normal function of the electronic system nor the normal ESM function.

SUMMARY

The object of the invention is to reduce at least some of the mentioned deficiencies with the prior art solutions and to provide:

a method and
a wideband antenna system to solve the problem to achieve an improved method and a wideband antenna system for minimizing the influence of interference sources over a wide bandwidth and optionally for estimating interference source parameters from e.g. jammers without the estimation causing interruption of neither the normal function of the electronic system nor the normal ESM function.

Minimisation of the influence of interference sources is achieved by providing a method comprising control of the Signal to Noise/interference Ratio, SNR, of a wideband antenna system connected to an electronic system. The wideband antenna system comprises at least one array of at least two antenna elements/sub arrays. The SNR control comprises establishing of cancellation directions for interfering frequencies in the antenna pattern in the direction of interference sources. The SNR control is achieved by affecting waveforms between the antenna elements and the electronic system with phase shifts or time delays obtained from an optimisation process for maximising the array processing gain of said array wherein the wideband antenna system being operational over a system bandwidth and operating with an instantaneous bandwidth B and wherein the cancellation directions in the direction of the interference sources over the instantaneous bandwidth B, are accomplished by:

transforming means being inserted between at least all but one of the antenna elements and the sub arrays in the wideband antenna system and the electronic system, a sub array comprising at least two sub elements, or the transforming means being integrated in the antenna element/sub array or the electronic system, parameters, being optimised by using the optimisation process over the instantaneous bandwidth B for maximizing the array processing gain of said array, and the transforming means affecting the waveforms between at least all but one of the antenna elements and the sub arrays and the electronic system by use of the parameters obtained from the optimisation process over the instantaneous bandwidth B.

Estimation of interference source parameters may be achieved by a method comprising estimation of interference source parameters in an evaluation process by:

estimation of Antenna Patterns, AP:s, for at least the frequencies corresponding to the M spectral components, locating frequency stable minima in the Antenna Patterns, AP:s, giving the number of interference sources and the direction to these sources and evaluating attenuation of the Antenna Patterns, AP:s, as a function of frequency in the frequency stable minima directions, giving the bandwidth of the interference sources.

Minimisation of the influence of interference sources is further arranged to be achieved by a wideband antenna system through an arrangement to control the Signal to Noise/interference Ratio, SNR, of the wideband antenna system. The wideband antenna system is connected to an electronic system and comprises at least one array of at least two antenna elements/sub arrays. The SNR control comprises means for establishing of cancellation directions for interfering frequencies in the antenna pattern in the direction of interference sources. The SNR control is arranged to be achieved by affecting waveforms between the antenna elements and the electronic system with phase shifts or time delays obtained from an optimisation process for maximising the array processing gain of said array wherein the wideband antenna system is arranged to be operational over a system bandwidth and arranged to operate with an instantaneous bandwidth B and wherein the cancellation directions in the direction of the interference sources over the instantaneous bandwidth B, are arranged to be accomplished by:

transforming means being arranged to be inserted between at least all but one of the antenna elements and the sub arrays in the wideband antenna system and the electronic system, a sub array comprising at least two sub elements, or the transforming means being integrated in the antenna element/sub array or the electronic system, parameters, being arranged to be optimised by using the optimisation process over the instantaneous bandwidth B for maximizing the array processing gain of said array, and the transforming means being arranged to affect the waveforms between at least all but one of the antenna elements and the sub arrays and the electronic system by use of the parameters obtained from the optimisation process over the instantaneous bandwidth B.

Estimation of interference source parameters may be further achieved by an arrangement for estimation of interference source parameters comprising means for performing an evaluation process to:

estimate Antenna Patterns, AP:s, for at least the frequencies corresponding to the M spectral components, locate frequency stable minima in the Antenna Patterns, AP:s, giving the number of interference sources and the direction to these sources and evaluate attenuation of the Antenna Patterns, AP:s, as a function of frequency in the AP frequency stable minima directions, giving the bandwidth of the interference sources.

A further advantage is that the invention also provides a JRC module arranged to receive an input comprising the parameters affecting the waveforms via an input connection from the electronic system or via a separate connection to the transforming means. The JRC module comprises means for performing the evaluation process for estimating the interference parameters. The JRC module is arranged to output the result of the estimation via an output connection to the electronic system.

DETAILED DESCRIPTION

The invention will now be described in detail with reference to the enclosed drawings.

Henceforth in the description the invention will be exemplified with a radar system as the electronic system which is subject to interference from a jammer, characterized as an intentional interference. The interference can also be caused by an unintentional Radio Frequency Interference (RFI) or clutter picked up in side lobes to the radar antenna and comprising signals reflected from objects within the radar antenna coverage. Henceforth in the description the interference will be exemplified by a jammer unless otherwise stated.

The information needed for estimation of the interference parameters are obtained from transforming means or from the electronic system as will be explained.

An antenna pattern is defined as radiated power as a function of direction when the antenna is operated in transmit mode and as sensitivity as a function of directions when the antenna is operated in receive mode.

A wideband cancellation direction is henceforth in the description used as a direction in the antenna pattern where the radiated power/sensitivity has a minimum being substantially below the radiated power/sensitivity in the direction having the maximum radiation/sensitivity.

Figure 1A:
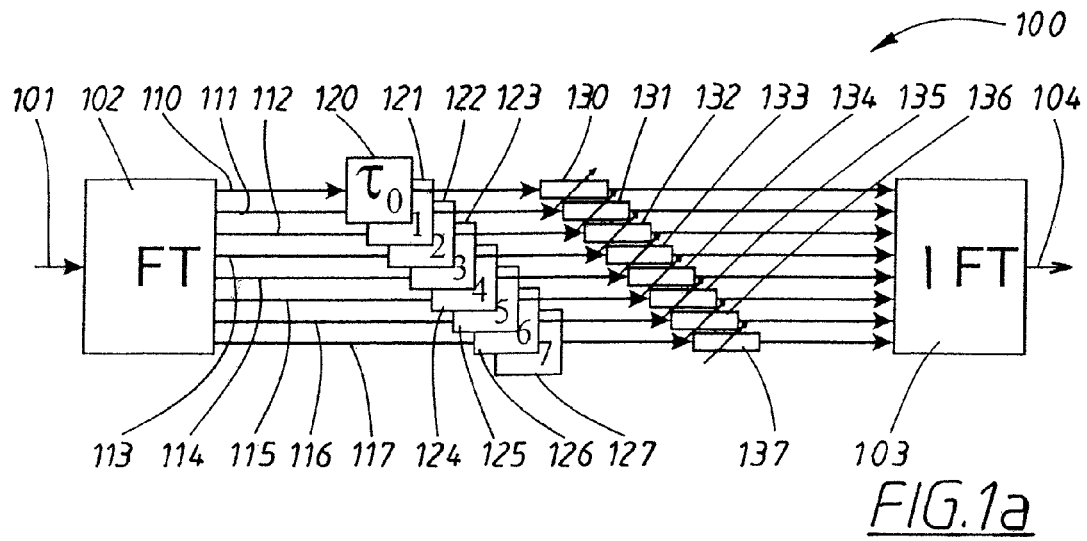
FIG. 1a schematically shows a digital solution of a realization of the transforming means in the frequency domain.

FIG. 1a schematically shows an example of a practical realization of a frequency dependent "true time delay" solution for a wideband array antenna. A wideband array antenna is defined as an array antenna having a bandwidth greater than or equal to an instantaneous operating bandwidth B. The instantaneous bandwidth B is the instantaneous operating bandwidth which will be described further in association with FIG. 3. In this example a time delay is used as a parameter being frequency dependent. The wideband array antenna comprises at least two antenna elements. The realization also includes an optional frequency dependent attenuation/amplification, i.e. the amplitudes of the waveforms are attenuated or amplified. In this optional embodiment two frequency dependent parameters are used; time delay and attenuation/amplification. Due to the reciprocity principle of antennas the inventive solution is applicable both for transmission and reception. An input waveform $s_{in}(t)$, 101, from an antenna element n in the wideband array antenna is fed to a Fourier Transformation (FT) unit 102 using for example a Fast Fourier Transformation (FFT), but other methods for calculation of the spectrum could be used. The FT unit transforms the instantaneous bandwidth B of the input waveform $s_{in}(t)$, 101, into M spectral components 0 to M−1, in this example into 8 spectral components 110-117, each spectral component having a centre frequency $f_m$. However the transformation can be made into more or less spectral components. The time delay $\tau_m$ (120-127) and the optional frequency dependent attenuation/amplification $a_m$ (130-137) are affecting each spectral component in through any suitable time delay and/or attenuation/amplification means well known to the skilled person. The spectral component 110 thus has a time delay $\tau_0$, 120, and an attenuation/amplification $a_0$, 130, the spectral component 111 a time delay $\tau_1$, 121, and an attenuation/amplification $a_1$, 131, and so on until the spectral component 117 having a time delay $\tau_7$, 127, and an attenuation/amplification $a_7$, 137. All spectral components are fed to an Inverse Fourier Transformation (IFT) unit, 103, using Inverse Fast Fourier Transformation (IFFT) or any other method, as for example IDFT (Inverse Discrete Fourier Transformation), transforming from the frequency domain to the time domain thus transforming all the spectral components back into the time domain and producing an output waveform $s_{out}(t)$, 104.

The time delay $\tau_m$ and the attenuation/amplification $a_m$ are examples of parameters for antenna element n affecting each spectral component m where the parameters are frequency dependent. The general designation for these element number and frequency dependent parameters are $\tau_{n,m}$ and $a_{n,m}$ where n ranges from 0 to N−1 and m from 0 to M−1.

The FT unit, the time delay and attenuation/amplification means and the IFT unit are parts of a first control element 100.

The invention can be implemented using only the frequency depending time delay $\tau(\omega)$. This solution is simpler to realize as the frequency depending attenuation/amplification is not required.

The function of the implementation with both the frequency dependent time delay and the attenuation/amplification according to FIG. 1a will now be described.

Parameters calculated from a frequency dependent weighting function $W(\omega)=A(\omega)\cdot e^{-j\cdot\omega\cdot\tau(\omega)}$ is in the example of FIG. 1a, affecting the waveforms between each antenna element n and the electronic system where $A(\omega)$, accounts for the frequency dependency of the attenuation/amplification and $\tau(\omega)$ account for the frequency dependency of the time delay. As an alternative the weighting function could be defined as $W(\omega)=A(\omega)\cdot e^{-j\cdot\phi(\omega)}$ where $A(\omega)$, still accounts for the frequency dependency of the attenuation/amplification and $\phi(\omega)$ account for the frequency dependency of the phase shift. Each antenna element is, in this example, connected to one first control element 100. The output waveform $s_{out}(t)$ 104 emitted from each first control element 100 as a function of the input waveform $s_{in}(t)$ 101 entering the first control element can be calculated with the aid of equation (1). $s_{in}(t)$ is the video-, intermediate frequency—(IF) or radio frequency (RF)-waveform from each antenna element when the antenna is working as a receiving antenna, but can also be the waveform on video, intermediate frequency (IF) or radio frequency (RF) level from a waveform generator in an electronic system when the wideband array antenna is working as a transmitting antenna.

$$s_{out}(t) = \frac{1}{2\cdot\pi} \cdot \underbrace{\int_{-\infty}^{\infty} W(\omega) \cdot \underbrace{\int_{-\infty}^{\infty} s_{in}(\tau) \cdot e^{-j\omega\tau} \cdot d\tau}_{\text{Fourier transform of } s_{in}(\tau)} \cdot e^{j\omega t} \cdot d\omega}_{\text{Invers Fourier transform back to the time domain}} = \quad (1)$$

$$\int_{-\infty}^{\infty} s_{in}(\tau) \cdot \underbrace{\frac{1}{2\cdot\pi} \cdot \int_{-\infty}^{\infty} W(\omega) \cdot e^{j\omega\cdot(t-\tau)} \cdot d\omega}_{\text{Invers Fourier transform of } W(\omega) = w(t-\tau)} \cdot d\tau =$$

-continued $$\int_{-\infty}^{\infty} s_{in}(\tau) \cdot w(t-\tau) \cdot d\tau = s_{in}(t) \otimes w(t)$$

In equation (1) the symbol ⊗ symbolize convolution. The principle of convolution is well known to the skilled person and can be further studied e.g. in "The Fourier Transform and its Applications", McGraw-Hill Higher Education, 1965 written by Ronald N. Bracewell.

The symbols used above and henceforth in the description have the following meaning:
$\omega$=angular frequency $(2\cdot\pi\cdot f)$
$w(t)$=time domain weighting function
$w(t-\tau)$=time delayed time domain weighting function
$W(\omega)$=frequency domain weighting function being the Fourier Transform of $w(t)$
$A(\omega)$=absolute value of $W(\omega)$
$a_m=A(\omega_m)$ absolute value of $W(\omega)$ at $\omega=\omega_m$ for antenna element n, generally designated $a_{n,m}$
$\tau$=time delay and integration variable
$\tau_m$=time delay of $\tau(\omega)$ at $\omega=\omega_m$ for antenna element n, generally designated $\omega_{n,m}$=time delay for spectral component m in antenna element n
$\tau(\omega)$=time delay as a function of $\omega$
$\phi(\omega)$=phase shift as a function of $\omega$
$\phi_m$=phase shift of $\phi(\omega)$ at $\omega=\omega_m$ for antenna element n, generally designated $\phi_{n,m}$=phase shift for spectral component m in antenna element n As mentioned above $\tau_{n,m}$ and $a_{n,m}$ are examples of element number and frequency dependent parameters for antenna element n affecting each spectral component m. The phase shift $\phi_{n,m}$ is another example of an element number and frequency dependent parameter for antenna element n affecting spectral component m.

Figure 1B:
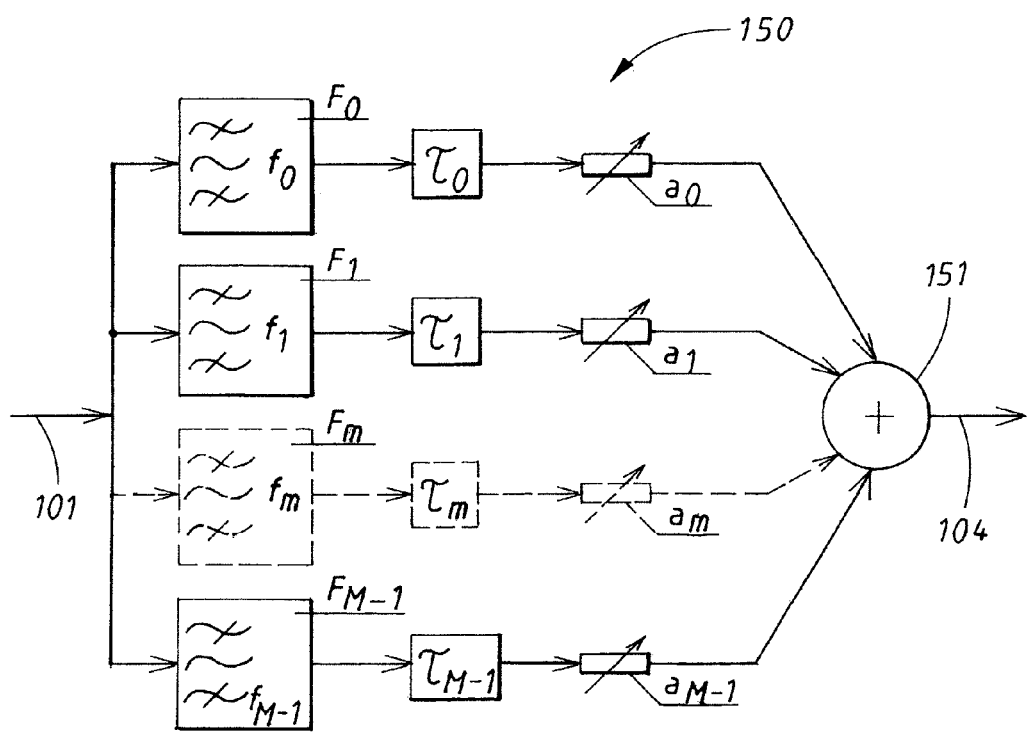
FIG. 1b schematically shows an analogue solution of a realization of the transforming means in the frequency domain.

FIG. 1a describes a digital realization of the first control element. FIG. 1b shows a corresponding analogue realization with the input waveform $s_{in}(t)$ 101 entering a third control element 150. The input waveform 101 coming from each antenna element n is fed to M band pass filters $F_m$ having a centre frequency $f_m$ where m assumes integer values from 0 to M−1. The input waveform 101 is thus split in M spectral components and a time delay $\tau_m$ or alternatively a phase shift $\phi_m$ and the optional frequency dependent attenuation/amplification $a_m$ are affecting each spectral component through any suitable time delay or phase shift and attenuation/amplification means well known to the skilled person. All spectral components are connected to a summation network 151 producing the output waveform $s_{out}(t)$, 104. A frequency $f_m$ of each spectral component can be calculated according to:

$$f_m = f_c - \frac{B}{2} + m\cdot\frac{B}{M}$$

for a case with equividistant spectral component division, where $f_c$ is the centre frequency in the frequency band with an instantaneous bandwidth B. The instantaneous bandwidth B is the instantaneous operating bandwidth. The third control element 150 comprises M band pass filters $F_m$, means for time delay and amplification/attenuation as well as the summation network 151.

A further digital realization will now be described with reference to FIGS. 2a and 2b. In many situations a time discrete realization, with discrete steps T in time, might be preferable. An output waveform $s_{out}(m\cdot T)$ emitted from a second control element (200) can then be calculated with the aid of equation (2) as a function of an input waveform $s_{in}$ (m·T) entering the second control element. The index m is an integer value increasing linearly as a function of time. $W(\omega_m)$ represents the time delay and attenuation/amplification of spectral component m, see FIG. 1. The FFT and the IFFT described in association with FIG. 1a, both requiring M·log$_2$(M) operations, are computational efficient methods for calculation of DFT (Discrete Fourier Transform) and IDFT (Inverse Discrete Fourier Transform), both requiring M$^2$ operations. M is as mentioned above the total number of spectral components. The output waveform is calculated as:

$$s_{out}(k \cdot T) = \underbrace{\frac{1}{M} \cdot \sum_{m=0}^{M-1} W(\omega_m) \cdot \underbrace{\sum_{l=0}^{M-1} s_{in}(l \cdot T) \cdot e^{-j \cdot 2 \cdot \pi \cdot l \cdot \frac{m}{M}}}_{\text{DFT of the input signal } s_{in}(k \cdot T)} \cdot e^{j \cdot 2 \cdot \pi \cdot m \cdot \frac{k}{M}}}_{\text{IDFT back to the time domain}} = \quad (2)$$

$$\sum_{l=0}^{M-1} s_{in}(l \cdot T) \cdot \underbrace{\frac{1}{M} \cdot \sum_{m=0}^{M-1} W(\omega_m) \cdot e^{j \cdot 2 \cdot \pi \cdot m \cdot \frac{k-l}{M}}}_{IDFT\{W(\omega_m)\} = w_{mod[(k-l),(M-1)]}} =$$

$$\sum_{l=0}^{M-1} s_{in}(l \cdot T) \cdot w_{mod[(k-l),(M-1)]} = s_{in}(k \cdot T) \otimes w_{mod[k,(M-1)]}$$

mod[x,y]=remainder after division of x by y
$\omega_m = 2 \cdot \pi \cdot f_m$ =discrete angular frequency
M=Number of spectral components
l=integer raising variable used in the DFT and the IDFT
k=integer raising variable for discrete time steps
m=integer raising variable for spectral components and integer raising variable used in the DFT.

As can be seen in equation (2) the desired functionality in a time discrete realization can be achieved with M operations.

FFT and DFT are different methods for Fourier Transformation (FT). IFFT and IDFT are corresponding methods for Inverse Fourier Transformation (IFT). As described above these methods have different advantages and the method most suitable for the application is selected. However any of the methods can be used when FT and/or IFT are/is required in the different embodiments of the invention.

Figure 2A:
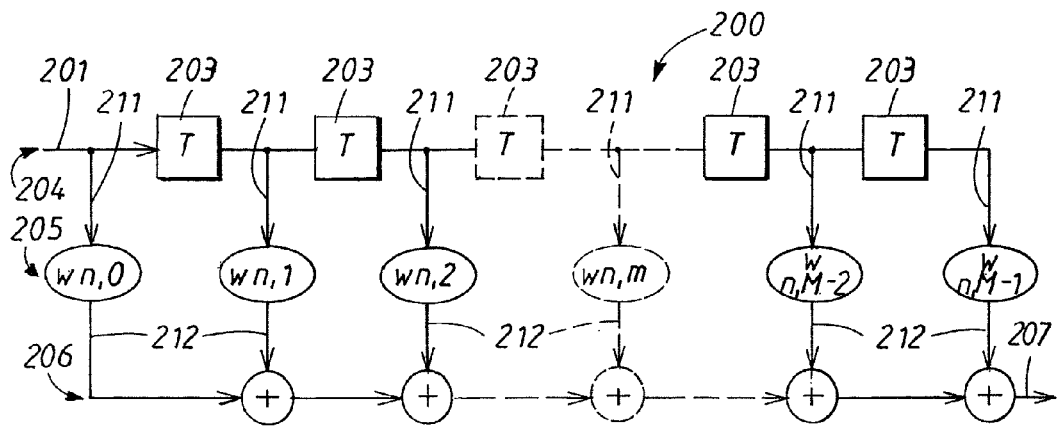
FIG. 2a schematically shows a realization of the transforming means in the time domain.

FIG. 2a shows the input waveform $s_{in}$(m·T) 201, coming from an antenna element in the wideband array antenna. The input waveform 201 is successively time delayed in M−1 time steps T, 203, numbered from 1 to M−1 and being time delayed copies of the input waveform $s_{in}$(m·T). The input waveform is thus successively time delayed with time steps T as illustrated in the upper part, 204, of FIG. 2a. M parameters comprising weighting coefficients $w_{n,0}$ to $w_{n,M-1}$, for antenna element n is identified with two indexes, the first representing antenna element number and the second a consecutive number m representing a spectral component and ranging from 0 to M−1. The weighting coefficients $w_{n,0}$ to $w_{n,M-1}$ thus is the weighting coefficient for antenna element n. The arrows 211 illustrate that the input waveform $s_{in}$(m·T) is multiplied with the first weighting coefficient $w_{n,0}$ and each time delayed copy of the input waveform is successively multiplied with the weighting coefficient having the same second index as the number of time step delays T included in the time delayed copy of the input waveform as illustrated in the middle part, 205, of FIG. 2a. The result of each multiplication is schematically illustrated to be moved, indicated with arrows 212, to the bottom part, 206, of FIG. 2a, where each multiplication result is summarized to the output waveform 207, $s_{out}$(m·T).

The dominating part of the time delay is not frequency dependent in a large antenna array (antenna array size considerably greater than the wavelength), resulting in many very small consecutive weighting coefficients, approximately equal to zero, at the beginning and end of the series of weighting coefficient $w_{n,0}$ to $w_{n,M-1}$ for each antenna element. Assume that the first x weighting coefficients and the last y weighting coefficients in the series of weighting coefficients $w_{n,0}$ to $w_{n,M-1}$ are approximately equal to zero. It could then be suitable in a hardware realization, to set the first x weighting coefficients and the last y weighting coefficients to zero and to integrate the first x time delays T into a time delay D, 202, equal to x·T as illustrated in FIG. 2b, and to exclude the last y multiplications to reduce the number of required operations to less than M operations. FIG. 2b otherwise corresponds to FIG. 2a. The time delay D, 202, corresponds to the non frequency dependent time delay, for each antenna element. The remaining frequency dependent time delay is called "delta time delay". FIG. 2b is an example of a computational efficient convolution, for calculation of the "delta time delay", preceded of the frequency independent time delay D, 202, used mainly for control of the main lobe direction for large antenna arrays.

The means for realizing the frequency independent time delay D and the means for frequency dependent time delays and attenuations/amplifications for each time delay T, are parts of the second control element 200.

Figure 2B:
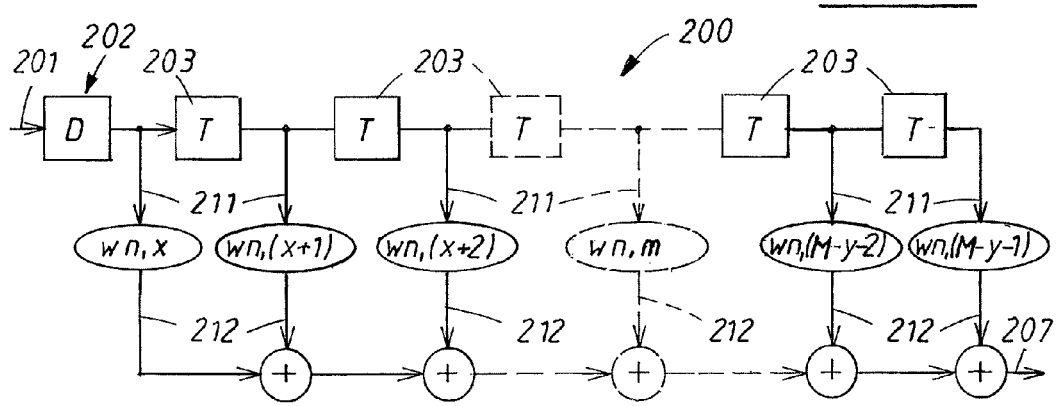
FIG. 2b schematically shows a realization in the time domain for an example of the transforming means including also a dominating non frequency dependent "true time delay".
Figure 2C:
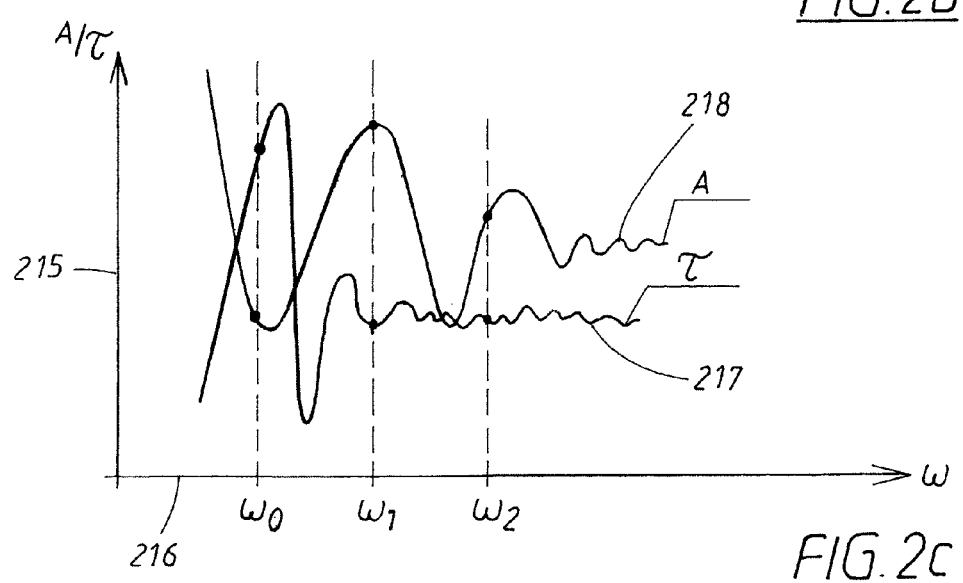
FIG. 2c shows a diagram of attenuation/amplification and time delays as a function of angular frequency ω (2·π·f).

FIG. 2c shows an example of the frequency dependency of the time delay τ and attenuation $A(\omega)$ on the vertical axis 215 as a function of $\omega$ (i.e. $2 \cdot \pi \cdot f$) on the horizontal axis 216. The time delay as a function of $\omega$ then forms a curve 217 and the attenuation/amplification a curve 218.

FIGS. 2a and 2b thus shows a realization of a frequency dependent time delay and attenuation/amplification in the time domain and FIGS. 1a and 1b shows a corresponding realization in the frequency domain. An advantage with the realization in the time domain is that only M operations are required while the realization in the frequency domain requires M·log$_2$(M) operations as described above.

All three control elements could as mentioned earlier be inserted either at video, intermediate frequency (IF) or directly on radio frequency (RF) level. It is easier to realize the control element at lower frequency but all hardware needed between the control element and the antenna element/sub array need to be multiplied with the number of control elements. In the description the invention is henceforth described as being realized at the RF level.

The three control elements are examples of transforming means, transforming an input waveform to an output waveform. The transforming means all have two ends, an input end receiving the input waveform and an output end producing the output waveform.

Figure 3:
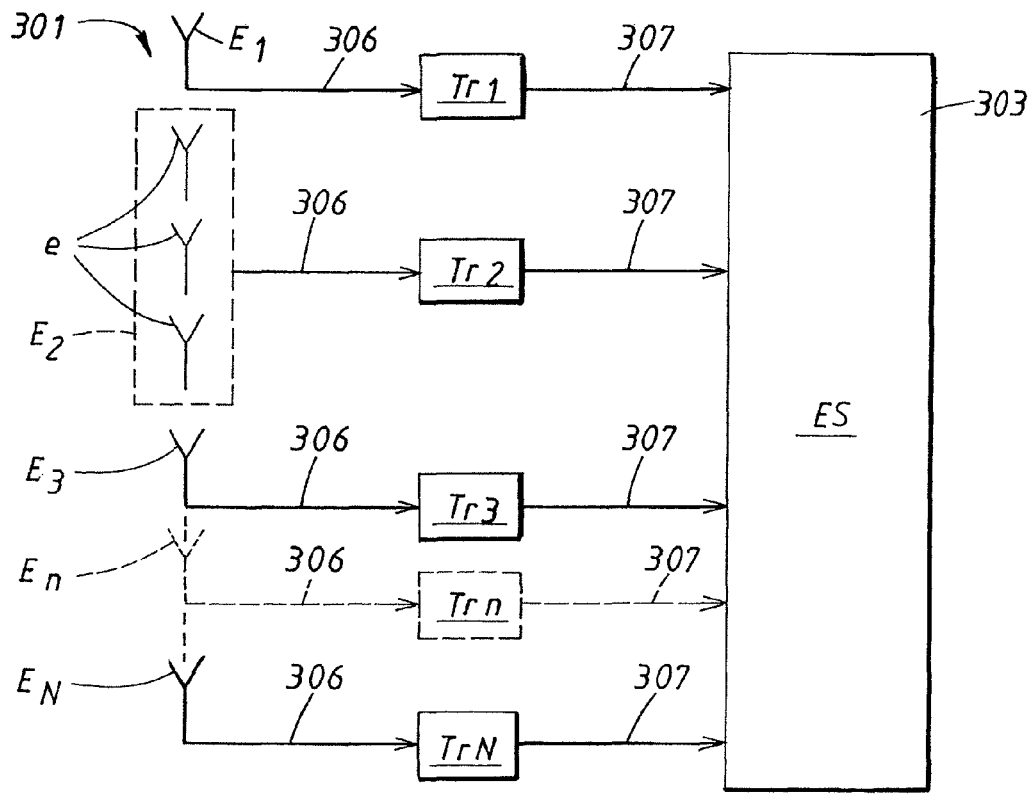
FIG. 3 schematically shows a block diagram of one example of how control of a wideband array antenna can be implemented.

FIG. 3 schematically shows a block diagram of one example of how the control of a wideband array antenna can be implemented. FIG. 3 shows the situation when the wideband array antenna 301 is working in receive mode. A wideband array antenna is defined as an array antenna having a bandwidth greater than or equal to the instantaneous operating bandwidth B. This bandwidth of the wideband array antenna is called the system bandwidth of an electronic system ES, 303 using the wideband array antenna. The electronic system may comprise receiver/s or parts of receiver/s and normally also transmitter/s or parts of transmitter/s. The instantaneous bandwidth B is the instantaneous operating bandwidth of the electronic system. The system bandwidth is the difference between the highest frequency and the lowest frequency over which the system can operate. In all practical usable systems is the instantaneous bandwidth B smaller than or equal to the system bandwidth. The wideband array antenna can optionally comprise one or several sub-arrays, each sub-array comprising two or more sub elements, e, preferably internally controlled by phase shifters and/or time delays. There are a total of N antenna elements, $E_1$ to $E_N$, and in this example a corresponding number of transforming means $Tr_1$ to $Tr_N$, An antenna element can also be a sub array. One transforming means is, in this example, inserted between each antenna element or sub arrays and the electronic system ES, 303, which e.g. can be a radar system, an ESM system or a communication system. $Tr_1$ is inserted between $E_1$ and the electronic system, $Tr_2$ between $E_2$ and the electronic system and so on until $Tr_N$ being inserted between $E_N$ and the electronic system ES, i.e. $Tr_n$ is inserted between corresponding antenna element or sub array $E_n$ and the electronic system ES. A wideband array antenna unit is defined as the wideband array antenna and the transforming means. In FIG. 3, $E_2$ is a sub array comprising three sub elements e. The input waveform in FIG. 3, $s_{in}(t)$ or $s_{in}(m \cdot T)$, 306, is emitted from each antenna element or sub array and fed to the corresponding transforming means. The output waveform $s_{out}(t)$ or $s_{out}(m \cdot T)$, 307, is fed to the electronic system 303. The waveforms 306 and 307 are individual for each antenna element or sub array. The parameters affecting the waveforms can be generated in the ES and then fed to the transforming means or the generation of the parameters can be performed in the transforming means.

Figure 4:
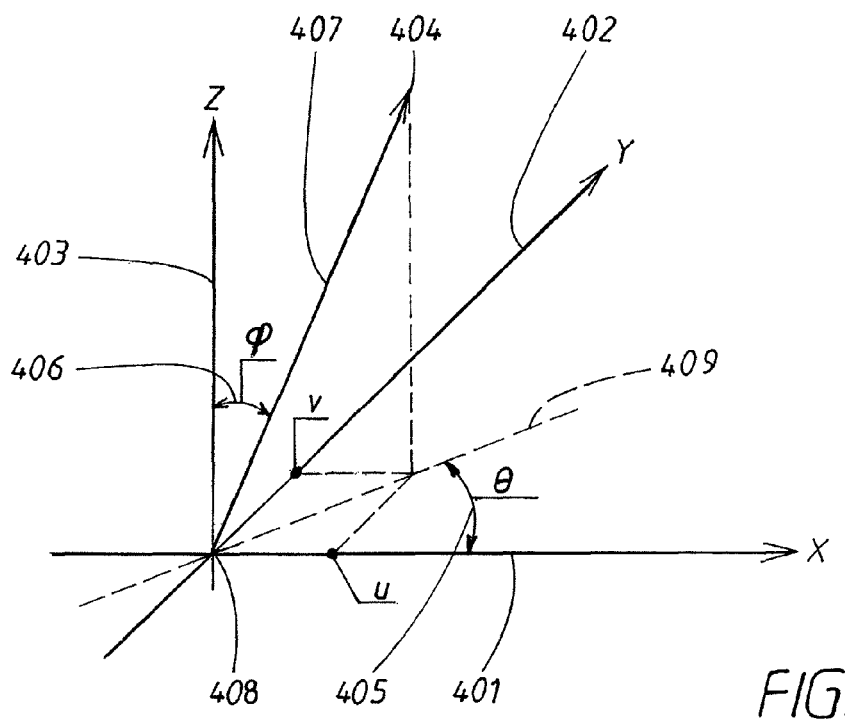
FIG. 4 shows the definition of angles φ and θ and u- and v-coordinates.

Angles $\theta$ and $\phi$ are used to define a direction in space and are defined as illustrated in FIG. 4. In a Cartesian coordinate system with X-axis 401, Y-axis 402 and Z-axis 403 the direction to a point 404 in space is defined by an angle $\theta$, 405, and an angle $\phi$, 406. The angle $\phi$ is the angle between a first line 407 from the origin 408 to the point 404 and the Z-axis. The angle $\theta$ is the angle between a second line 409 being the orthogonal projection of the line 407 on the X-Y plane and the X-axis. In an uv-coordinate system the first line 407 represents a unit vector $\hat{r}$ being the unit vector in the observation direction. The projection of the second line 409 on the X-axis represents an u-coordinate, u, and the projection on the Y-axis represents a v-coordinate, v.

As mentioned above the transforming means are normally inserted between each antenna element or sub array and an electronic system ES. The transforming means are connected either directly or indirectly to an antenna element or sub array at one end and either directly or indirectly to the electronic system at the other end. In one embodiment when the transforming means are inserted at video level, one end of the transforming means can be directly connected to the electronic system and the other end indirectly connected to an antenna element or sub array via electronic hardware such as mixers. In another embodiment when the transforming means are inserted at RE-level, one end of the transforming means can be directly connected to an antenna element or sub array and the other end directly to the electronic system. The required mixer hardware in this embodiment is included in the electronic system. In yet another embodiment when the transforming means are inserted at IF-level one end of the transforming means can be indirectly connected to an antenna element or sub array via electronic hardware such as mixers and the other end indirectly connected via electronic hardware such as mixers to the electronic system.

The transforming means can be separate units or integrated in the antenna elements or sub arrays or in the electronic system.

The wideband antenna system and corresponding method can comprise an array antenna with at least two antenna elements/sub arrays, i.e. the wideband array antenna, or a main antenna and a wideband auxiliary antenna, each comprising at least one antenna element. If the wideband antenna system comprises a main antenna and a wideband auxiliary antenna the main antenna can be any type of antenna comprising one or several antenna elements, e.g. a radar antenna, and the wideband auxiliary antenna can be a single antenna element or an array of antenna elements/sub arrays. An antenna element can also be a sub array comprising at least two sub elements, as illustrated with sub array $E_2$ in FIG. 3. A wideband control of the Signal to Noise/interference Ratio, henceforth called the SNR, over the instantaneous bandwidth B is accomplished by the transforming means 100, 200, 150, $Tr_1$-$Tr_N$ being inserted, or arranged to be inserted, between at least all but one of the antenna elements or sub arrays ($E_1$-$E_N$) in the wideband array antenna and the electronic system 303 and between at least all but one of the antenna elements or sub arrays in the combined main antenna and wideband auxiliary antenna and the electronic system 303. The transforming means can also be integrated, or arranged to be integrated, in the antenna element/sub array or the electronic system. This means that at least all but one of the waveforms from the antenna elements or the sub arrays in the wideband array antenna or at least all but one of the waveforms from the combined main antenna and wideband auxiliary antenna have to pass through transforming means.

A common solution is that the transforming means 100, 200, 150, $Tr_1$-$Tr_N$ are inserted, or arranged to be inserted, between all of the antenna elements or sub arrays ($E_1$-$E_N$) in the wideband array antenna and the electronic system (303) and between all of the antenna elements or sub arrays in the wideband auxiliary antenna and the electronic system 303.

In the situation where the wideband antenna system comprises a main antenna with one antenna element, or sub array, and a wideband auxiliary antenna with at least one antenna element it is sufficient that a transforming means is connected only to the antenna elements of the wideband auxiliary antenna and that the output waveforms from the transforming means is added to the waveform of the main antenna. The main antenna does not necessarily have to be connected to the transforming means. The important aspect is that at least two waveforms are interacting, where all waveforms, or all waveforms but one, have been transmitted through a transforming means.

In the case where one waveform is not affected by a transforming means this waveform serves as a reference and the parameters for the transforming means affecting the other waveforms are adapted to this reference. This principle is, as mentioned above, also true for the wideband array antenna where one of the antenna elements or sub arrays can be without a transforming means. When the wideband antenna system is realized with a main antenna and a wideband auxiliary antenna, the main beam is defined as the main beam of the main antenna.

An instantaneous wideband waveform has at every moment a wide bandwidth. This is in contrast to e.g. a stepped frequency waveform that can be made to cover a wide bandwidth by switching to different narrow frequency bands. A waveform with the instantaneous bandwidth B is defined as narrow band if $B \cdot L \ll c_0$, where L is the longest dimension of the antenna, in this case the wideband array antenna and $c_0$ is the speed of light. Waveforms and bandwidths not being instantaneous narrow band according to this definition are considered to be instantaneous wideband waveforms or instantaneous wideband bandwidths. This definition of an instantaneous wideband waveform or an instantaneous wideband bandwidth is used in this description. Thus, an advantage of the invention is the possibility to operate with an instantaneously wideband waveform. An instantaneously wideband waveform is a waveform occupying a wide bandwidth.

When dividing an antenna aperture in sub arrays each sub array is preferably small enough to fulfil the inequality $B \cdot L_{sub} \ll c_0$, where the longest dimension of the sub array is $L_{sub}$, to facilitate narrow band control with phase shifters and/or time delays internally in the sub arrays.

The invention will now be described with one example showing how to cancel jammer interference and estimate jammer parameters by using the possibilities for control of the SNR. The means for providing control of the SNR of the wideband antenna system comprises the transforming means using one or several parameters obtained from an optimisation process over the instantaneous bandwidth B for maximising an array processing gain of the wideband antenna system.

Figure 12:
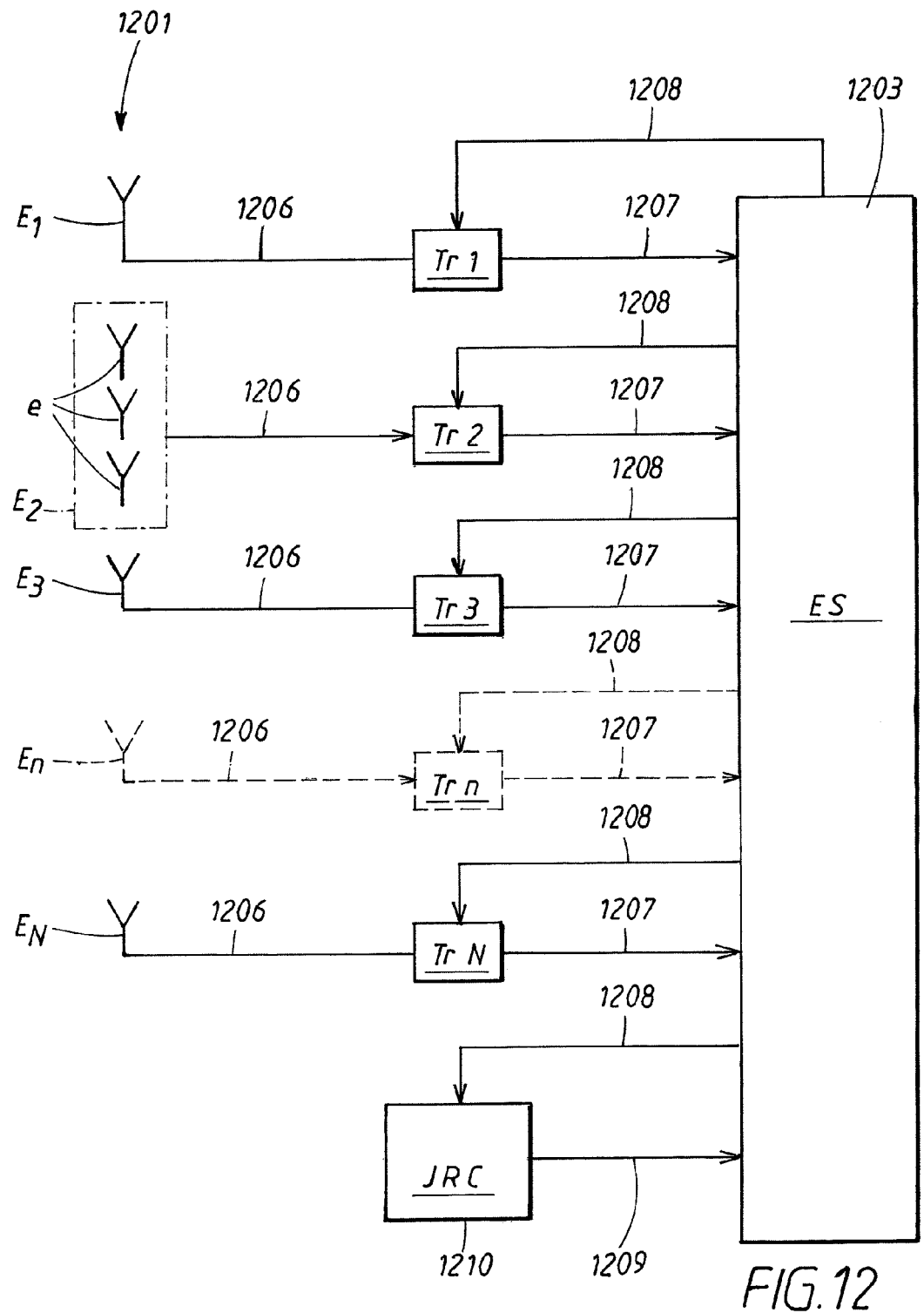
FIG. 12 schematically shows a block diagram of one example of how the invention can be implemented including the estimation of jammer parameters.

The invention provides a method, and a corresponding wideband antenna system implementing the method, to minimise, or a wideband antenna system arranged to minimise, the influence of interference sources by control, or an arrangement to control, of the Signal to Noise/interference Ratio, SNR, of the wideband antenna system, connected to an electronic system 303 and comprising at least one array of at least two antenna elements/sub arrays ($E_1$-$E_N$). The SNR control comprises establishing, or means for establishing, of cancellation directions for interfering frequencies in the antenna pattern in the direction of interference sources. The SNR control is achieved, or arranged to be achieved, by affecting waveforms between the antenna elements and the electronic system 303 with phase shifts or time delays obtained from an optimisation process for maximising the array processing gain of said array wherein the wideband antenna system is operational, or arranged to be operational, over a system bandwidth and operating, or is arranged to operate, with an instantaneous bandwidth B. The cancellation directions in the direction of the interference sources over the instantaneous bandwidth B, are accomplished, or arranged to be accomplished, by introducing transforming means affecting the waveforms between the antenna elements/sub arrays and the electronic system with parameters obtained from an optimisation process over the instantaneous bandwidth B as will be explained. The antenna elements and the electronic system have to be designed to be operable over the system bandwidth. This overall design of the antenna elements and the electronic system, excluding the parts of the electronic system that may be used by the invention, as will be explained e.g. in association with FIG. 12, is not part of the invention. The transforming means however, as disclosed herein, are also operable over the system bandwidth. The instantaneous bandwidth B is the bandwidth the antenna system and the electronic system can handle instantaneously, i.e. at the same moment. The system bandwidth thus always has to be greater than the instantaneous bandwidth B.

It will be shown with an example of the invention that it is possible to estimate the number of jammers, all jammer directions and the bandwidth of each jammer based on parameters comprising the weighting coefficients in a w-matrix or a W-matrix obtained after the optimisation process over the instantaneous bandwidth B in the receive mode. The weighting coefficients for each antenna element n forms a row in the w-matrix $w_{n,0}, w_{n,1}, w_{n,2} \ldots w_{n,-1}$ and forms a Fourier transform pair with the corresponding row in the W-matrix $W_{n,0}, W_{n,1}, W_{n,2} \ldots W_{n,M-1}$. These jammer directions could also be used either to create deterministic cancellation directions in transmit mode or to create deceptive transmit beams carrying waveforms with either frequency offset or orthogonal modulation relative to the used waveform in the true main beam.

"Theory of Adaptive radar", IEEE Trans., vol. AES-p, pp. 237-252, March 1973 by Brennan, L. E. and I. S. Reed is a classical paper, henceforth called Brennan, that gives a detailed description of narrowband, single frequency, adaptive iterative optimisation process for minimising Signal to Noise Ratio. In summary the theory developed by Brennan is in one example of the invention, applied to a single spectral component, m. By using this theory for all M spectral components individually, but simultaneously, optimisation over the instantaneous bandwidth B is achieved. Brennan is however only using a single spectral component. A matrix of complex weighting coefficients, $W_{n,m}(i)$, results after each iteration. Where:

$n \epsilon [0, 1 \ldots (N-1)]$ Where N is equal to the number of antenna elements, also including sub arrays $m \epsilon [0, 1 \ldots (M-1)]$ Where M is equal to the number of spectral components $i \epsilon [0, 1 \ldots \infty]$ Where i is equal to the iteration number As the invention normally uses one transforming means to each antenna element, N is also normally equal to the number of transforming means. As mentioned earlier the number of transforming means can however be one less than the total number of antenna elements and sub arrays.

The initial weighting coefficients matrix, $W_{n,m}(0)$, is split into N vectors, one for each transforming means, containing M elements each. The first transforming means receives the vector $W_{0,m}(0)$ and the second transforming means the vector $W_{1,m}(0)$ and so forth. After the first iteration, adaptation of the weighting coefficients, $W_{n,m}$, to increase the signal to jammer-noise ratio is made and the process is repeated with $W_{n,m}(1)$ and so forth. Convergence for each spectral component is ensured according to Brennan. The W-matrix is updated after each iteration.

A more practical approach for an optimisation process covering the instantaneous bandwidth B is to work directly in the time domain using a transforming means according to the block diagram in FIG. 2a, requiring less number of operations as described earlier in association with FIGS. 2a and 2b. The time domain weighting coefficients used in each transforming means could either be calculated as the IDFT, as indicated in equation (2), using frequency domain weighting coefficients calculated according to Brennan as input or the more direct approach described below could be used.

The optimisation process over the instantaneous bandwidth B can however also be performed in the frequency domain using the weighting coefficients of the W-matrix.

Assume an example with an array antenna with N antenna elements each equipped with a transforming means using M coefficients $w_{n,m}$ for affecting the waveforms. The direction of the main lobe is known, i.e. the angles $\theta_{MB}$ and $\phi_{MB}$ are known, at the start of this iterative optimisation process over the instantaneous bandwidth B that now will be explained. In this example the undesired part of a received signal is exemplified with interference from three jammers and from receiver noise. The undesired part can in other examples comprise also interference from RFI and/or clutter in addition to or instead of interference from the jammer and receiver noise. Assume further that the received signal, Z, corresponding to $s_{in}(m \cdot T)$, could be divided in one desired part, SD (signal desired), and one undesired part, JN (in this example jammer & receiver noise), that both could be sampled in space by $n \epsilon [0 \ldots (N-1)]$ antenna elements (including also sub arrays) and in time at $k \epsilon [-\infty \ldots \infty]$ occasions. The value of these samples could be calculated as indicated in equation (3) and (4) respectively. In the calculations to follow it is assumed that the desired part of the received signal is an amplitude scaled copy of the transmitted signal. In reality the desired signal could both be scaled in amplitude and contracted/expanded in time. The amplitude scaling is due to the range to the target and the equivalent target area of the target. The contraction/expansion in time is due to the relative velocity between the target and the antenna. Each sample, $Z_{n,k}$, will have a value equal to $Z_{n,k}=SD_{n,k}+JN_{n,k}$.

$$SD_{n,k} = C \cdot u_{Tx}[k \cdot T - \tau_n(\theta_{MB}, \varphi_{MB})] \tag{3}$$

$$JN_{n,k} = n_{Rx_n}(k \cdot T) + \sum_{j=0}^{J-1} n_{J_j}[k \cdot T - \tau_n(\theta_{J_j}, \varphi_{J_j})] \tag{4}$$

Where:
- C Constant depending on, range to the target and equivalent target area of the target
- $u_{Tx}(t)$ Transmitted waveform in the main beam as a function of time
- T Time between consecutive samples
- $\tau_n(\theta,\varphi)$ Delay projection for element n, equal to the projection of the vector from the phase centre (origin) to antenna element n onto the unit vector, a three dimensional vector of unit length, in the direction $(\theta,\varphi)$ divided with $c_0$
- $n_{Rx_n}(t)$ Receiver noise waveform in antenna element n as a function of time
- j Integer jammer counting variable, $j \in [0 \ldots (J-1)]$
- $n_{Jj}(t)$ Jammer noise waveform in antenna element n as a function of time, $j \in [0 \ldots (J-1)]$
- J Number of jammers
- $\theta_{MB}$ Theta direction of the main beam
- $\varphi_{MB}$ Phi direction of the main beam
- $\theta_{Jj}$ Theta direction of jammer, $j \in [0 \ldots (J-1)]$
- $\varphi_{Jj}$ Phi direction of jammer, $j \in [0 \ldots (J-1)]$
- k Integer increasing as a function of time The above designations are also used henceforth.

The output samples, $Y_{n,k}$, from antenna element n can thus be calculated according to equation (5).

$$Y_{n,k} = \sum_{m=0}^{M-1} w_{n,m} \cdot Z_{n,(k-m)} \tag{5}$$

The output samples, $X_k$, of the output signal vector X from the wideband array antenna can thus be calculated according to equation (6).

$$X_k = \sum_{n=0}^{N-1} Y_{n,k} = \sum_{n=0}^{N-1} \sum_{m=0}^{M-1} w_{n,m} \cdot Z_{n,(k-m)} \tag{6}$$

The probability of detection of a target is a monotonically increasing function of a Signal to Noise/interference Ratio, SNR. The probability of detection is thus maximized by maximizing the SNR according to Brennan which also means that cancellation directions are accomplished in the direction of interference sources. Brennan is however only establishing narrow band (single frequency) cancellation directions in the direction of interference sources in contrast to the invention having the possibility of establishing cancellation directions over the entire instantaneous bandwidth B due to the implementation of the optimisation process over the instantaneous bandwidth B and the implementation of the above described transforming means. The minimising of the interference sources is thus accomplished over a wide bandwidth compared also to e.g. the narrow band SLC solutions of today. Commence by calculating the variance of the output samples. The result is found in equation (7).

$$\text{var}(X) = \tag{7}$$

$$E[|X|^2] - \underbrace{|E[X]|^2}_{\text{Assume: } E[X]=0} = \sigma_{Tx}^2 \cdot \sum_{n=0}^{N-1} \sum_{n'=0}^{N-1} \sum_{m=0}^{M-1} \sum_{m'=0}^{M-1} w_{n',m'}^* \cdot w_{n,m} \cdot$$

$$c_{Tx}[(m'-m) \cdot T + \tau_{n'}(\theta_{MB}, \varphi_{MB}) - \tau_n(\theta_{MB}, \varphi_{MB})] +$$

$$\sigma_{Rx}^2 \cdot \sum_{n=0}^{N-1} \sum_{n'=0}^{N-1} \sum_{m=0}^{M-1} \sum_{m'=0}^{M-1} w_{n',m'}^* \cdot w_{n,m} \cdot$$

$$\left\{ \delta_{n',n} \cdot c_{Rx}[(m'-m) \cdot T] + \right.$$

$$\sum_{j=0}^{J} \frac{\sigma_{Jj}^2}{\sigma_{Rx}^2} \cdot c_{Jj}[(m'-m) \cdot T +$$

$$\left. \tau_{n'}(\theta_{Jj}, \varphi_{Jj}) - \tau_n(\theta_{Jj}, \varphi_{Jj})] \right\}$$

Where:
- E[ . . . ] Expected value of . . .
- $\sigma_{Tx}$ Standard deviation of $u_{Tx}(t)$
- $\sigma_{Rx}$ Standard deviation of $n_{Rx_n}(t)$, assumed to be equal for all n
- $\sigma_{Jj}$ Standard deviation of $n_{Jj}(t)$, $j \in [0 \ldots (J-1)]$
- $c_{Tx}$ Normalized autocorrelation function of $u_{Tx}(t)$
- $c_{Rx}$ Normalized autocorrelation function of $n_{Rx_n}(t)$, assumed to be equal for all n
- $C_{Jj}$ Normalized autocorrelation function of $n_{Jj}(t)$, $j \in [0 \ldots (J-1)]$
- $\delta_{n',n}$ Kronecker's delta function (Equal to unity if n'=n, equal to zero otherwise)
- Star asterix * Denotes complex conjugate
- $n \in [0, 1 \ldots (N-1)]$ First integer raising variable for antenna elements. N is equal to the number of antenna elements
- $n' \in [0, 1 \ldots (N-1)]$ Second integer raising variable for antenna elements. N is equal to the number of antenna elements
- $m \in [0, 1 \ldots (M-1)]$ First integer raising variable for transforming means coefficients. M is equal to the number of spectral components
- $m' \in [0, 1 \ldots (M-1)]$ Second integer raising variable for transforming means coefficients. M is equal to the number of spectral components The above designations are also used henceforth.

The variance is a measure of how much the output signal X deviates from an expected value which is equal to the square of the standard deviation σ.

The variance in equation (7) could be divided in one "signal contribution", $\sigma_S^2$, (JN=0) and one "jammer & receiver noise contribution", $\sigma_N^2$, (SD=0) and the SNR in the main beam direction can be calculated as indicated in equation (8). Observe that Normalised Array Processing Gain NAPG(w,θ, φ) is both introduced and defined in equation (8). The array processing gain is normalised with its theoretical limit equal to the total number of elements $N_{Tot}$. The total number of elements is equal to the sum of all antenna elements without any sub elements and all sub elements. NAPG will thus always be less than or equal to 0 dB. The array processing gain in the main beam is a wideband antenna efficiency parameter, closely related to the narrowband efficiency parameter named "aperture efficiency" but valid for the wideband application.

$$SNR = \qquad (8)$$

$$\frac{\text{var}(X)|_{JN=0}}{\text{var}(X)|_{SD=0}} = SNR_{Input} \cdot NAPG(w, \theta_{MB}, \varphi_{MB}) = \frac{\sigma_S^2}{\sigma_N^2} = N_{Tot} \cdot \underbrace{\frac{\sigma_{Tx}^2}{\sigma_{Rx}^2}}_{SNR_{input}}$$

$$\frac{1}{N_{Tot}} \cdot \sum_{n=0}^{N-1}\sum_{n'=0}^{N-1}\sum_{m=0}^{M-1}\sum_{m'=0}^{M-1} w_{n',m'}^{*} \cdot w_{n,m} \cdot$$

$$\frac{c_{Tx}[(m'-m) \cdot T + \tau_{n'}(\theta_{MB}, \varphi_{MB}) - \tau_n(\theta_{MB}, \varphi_{MB})]}{\sum_{n=0}^{N-1}\sum_{n'=0}^{N-1}\sum_{m=0}^{M-1}\sum_{m'=0}^{M-1} w_{n',m'}^{*} \cdot w_{n,m} \cdot}$$

$$\underbrace{\left\{\begin{array}{c} \delta_{n',n} \cdot c_{Rx}[(m'-m) \cdot T] + \sum_{j=0}^{J-1} \frac{\sigma_{J_j}^2}{\sigma_{Rx}^2} \cdot \\ c_{J_j}[(m'-m) \cdot T + \tau_{n'}(\theta_{J_j}, \varphi_{J_j}) - \tau_n(\theta_{J_j}, \varphi_{J_j})] \end{array}\right\}}_{NAPG(w,\theta_{MB},\varphi_{MB})=\text{Expression to be maximized,as a function of } w}$$

Where:

NAPG(w,θ,φ) Normalised Array Processing Gain

NAPG(w,$\theta_{MB}$, $\phi_{MB}$) Expression to be maximized $SNR_{Input}$ SNR excluding the array processing gain The above designations are also used henceforth.

We see from equation (8) that the expression for SNR could be divided into two parts, $SNR_{Input}$ and NAPG. $SNR_{Input}$ expresses the theoretical limit for the array processing gain. NAPG is thus defined as the actual SNR value normalised with the theoretical limit equal to $SNR_{Input}$ as indicated in equation (9) below.

$$NAPG = \frac{SNR}{SNR_{Input}} = \frac{1}{SNR_{Input}} \cdot \frac{\sigma_S^2}{\sigma_N^2} = \frac{\sigma_{Rx}^2}{N_{Tot} \cdot \sigma_{Tx}^2} \cdot \frac{\sigma_S^2}{\sigma_N^2} \qquad (9)$$

The remaining problem is to find the weighting coefficients $w_{n,m}$ that maximize NAPG(w, $\theta_{MB}$, $\phi_{MB}$). This is done, in this example, by iteration of $w_{n,m}$ the direction with "steepest ascent". It should be noted that the numerator of NAPG(w, $\theta_{MB}$, $\phi_{MB}$) could be calculated and that the denominator could be measured, with the transmitter switched off, for each set of weighting coefficients $w_{n,m}$.

In each iteration all complex partial derivatives of NAPG (w, $\theta_{MB}$, $\phi_{MB}$) are approximated according to the right hand side of equation (10), with respect to each coefficient $w_{n,m}$. These approximations of the complex partial derivatives could be represented with a complex matrix G(w, $\theta_{MB}$, $\phi_{MB}$) with N rows and M columns, where each element $g_{n,m}$ is calculated according to equation (10).

$$g_{n,m} = \qquad (10)$$

$$\frac{\partial NAPG[w, \theta_{MB}, \varphi_{MB}]}{\partial w_{n,m}} \approx \frac{|NAPG[(w + \Delta s \cdot \delta_{n,m}), \theta_{MB}, \varphi_{MB}]| - |NAPG[(w - \Delta s \cdot \delta_{n,m}), \theta_{MB}, \varphi_{MB}]|}{2 \cdot \Delta s} +$$

$$j \cdot \frac{|NAPG[(w + j \cdot \Delta s \cdot \delta_{n,m}), \theta_{MB}, \varphi_{MB}]| - |NAPG[(w - j \cdot \Delta s \cdot \delta_{n,m})\theta_{MB}, \varphi_{MB}]|}{2 \cdot \Delta s}$$

In equation (10) above j denotes the imaginary part of a complex expression.

A partial derivative of a function $f(x_1, \ldots, x_n)$ in the direction $x_i$ at the point $(a_1, \ldots, a_n)$ is defined to be:

$$\frac{\partial f(a_1, \ldots, a_n)}{\partial x_i} = \lim_{h \to 0} \frac{f(a_1, \ldots, a_i + h, \ldots, a_n) - f(a_1, \ldots, a_n)}{h}$$

The scalar "step length" Δs is a small adjustable value.

A new updated matrix of weighting coefficients, $w_{new}$, is calculated by updating a previous matrix of coefficients, $w_{old}$, according to equation (11) below.

$$w_{new} = w_{old} + \Delta s \cdot G \qquad (11)$$

In equation (11) Δs is the scalar "step length" and $w_{new}$, $w_{old}$, and G all are matrixes with N rows and M columns. The scalar "step length" Δs can be adjustable, e.g. in 3 dB steps, to maximise the ratio, $\Delta NAPG_{MB}$, of the "new" and "old" in the main beam direction:

$$\Delta NAPG_{MB} = |NAPG(w_{new}, \theta_{MB}, \phi_{MB})|/|NAPG(w_{old}, \theta_{MB}, \phi_{MB})|$$

The $NAPG_{MB}$, may thus be maximized, or arranged to be maximized by an arrangement, by calculating a new w-matrix, $w_{new}$ by continuously adding a scalar step Δs multiplied with a G-matrix to an old w-matrix $w_{old}$ until the ratio:

$$\Delta NAPG_{MB} = |NAPG_{MB}(w_{new})|/|NAPG_{MB}(w_{old})|$$

has converged towards unity where the scalar "step length" Δs is a small adjustable value, and where the G-matrix includes all partial derivatives of $NAPG_{MB}$ with respect to the continuously updated $w_{new}$ matrix.

Figure 5:
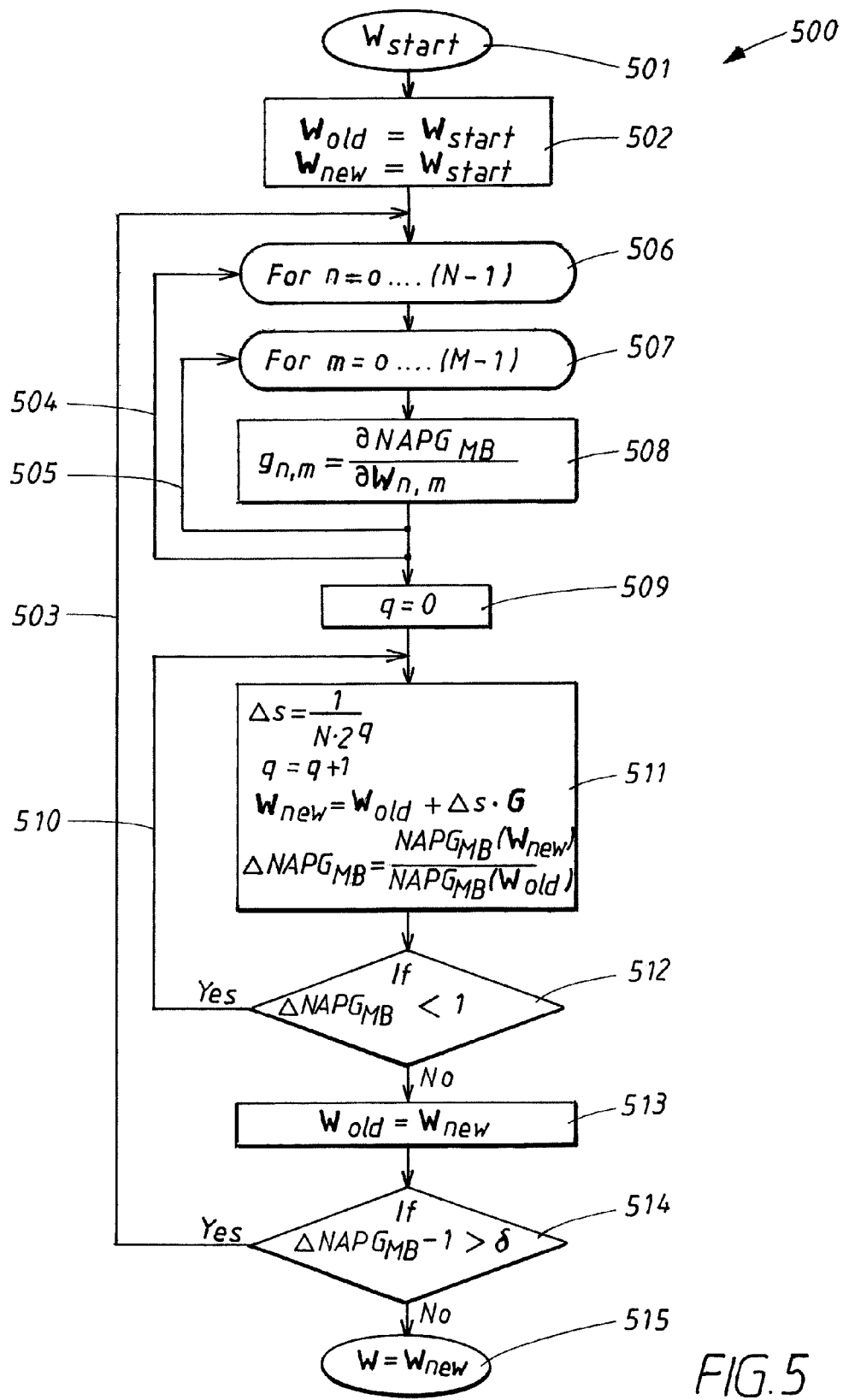
FIG. 5 shows a flow chart of one iterative optimisation process over the instantaneous bandwidth B to obtain an estimate of the optimum w-matrix.

The flow chart of FIG. 5 shows the iteration steps from $w_{start}$ to $w_{new}$ in the optimisation process over the instantaneous bandwidth B, 500. The w-matrix is assigned a start value $w_{start}$ in starting step 501. In initiating step 502 a w-matrix $w_{old}$ and $w_{new}$ both are assigned the value of $w_{start}$. An outer first "if-loop" 503 continues until the $\Delta NAPG_{MB}$ only exceeds 1 by less than δ, as will be decided in a second if-step 514. After the initiating step 502 has been performed the first "for-loop" n=0 . . . (N−1) is started in a first "for start" step 506 after which the second "for-loop" m=0 . . . (M−1) is started in a second "for start" step 507. After the two "for-loops" have been started the estimate of all partial derivatives, $g_{n,m}$ are performed in the derivatives step 508. $g_{n,m}$ is calculated as $\Delta NAPG_{MB}$ divided with $\Delta w_{n,m}$ as described above. When both "for-loops" have been run through, the complete complex matrix G(w, $\theta_{MB}$, $\phi_{MB}$) has been calculated in the derivatives step 508. After the derivatives step 508, a counting integer q is set to zero in q-step 509. Thereafter the second "if-loop" 510, also located inside the outer first "if-loop" 503 is entered with a calculation step 511. This "if-loop" continues as long as the ratio of the new and old NAPG, i.e. $\Delta NAPG_{MB}$ is less than unity which is decided in a first if-step 512 after the calculation step 511. In the calculation step 511a new step size Δs is calculated as $1/N \cdot 2^q$ and the counting integer q is increased with unity to ensure that the step size is halved during the next turn in the second "if-loop" 510. The calculation step 511 then also comprises the updating of the w-matrix by setting $w_{new}=w_{old}+\Delta s \cdot G$. The calculation step 511 is then finalized by calculating $\Delta NAPG_{MB}$. When $\Delta NAPG_{MB}$ exceeds unity which is decided in the first if-step 512 the second "if-loop" is terminated and the w-matrix is updated in an updating step 513 setting $w_{old}=w_{new}$. After that it is tested in the second if-step 514 if $\Delta NAPG_{MB}$ is sufficiently greater than 1 by a selected predetermined amount δ. If yes, the first "if-loop" 503 continues by starting up the two "for-loops" again. If the predetermined amount δ is not exceeded, the optimization process is terminated by exiting the first "if-loop" 503 and the contents of the $w_{new}$-matrix is chosen as an estimate of the optimum w-matrix at the end step 515. The predetermined amount δ is a compromise between computational time and the accuracy in the estimate of the w-matrix. It is normally chosen as a small fraction of 1 dB.

By running through the optimisation process over the instantaneous bandwidth B, 500, as described above an estimation of the w-matrix, giving the maximum $NAPG_{MB}$, has been found by implementing the "steepest ascent" principle as described above. The optimisation process over the instantaneous bandwidth B is thus estimating, or arranged to estimate, the w-matrix resulting in the maximum Normalized Array Processing Gain, for a known Main Beam direction, $NAPG_{MB}$, for the wideband array antenna or the wideband auxiliary antenna combined with a main antenna.

The iterative optimisation process over the instantaneous bandwidth B, 500, described in FIG. 5 is one example of how to receive an estimate of the w-matrix giving the maximum value of the NAPG. The invention is applicable using any similar variation of this process, iterative or non-iterative, as long as this process produces an estimate of the w-matrix giving the maximum value of the array processing gain over the instantaneous bandwidth B.

Also a W-matrix can be used in the optimisation process over the instantaneous bandwidth B. This means that the parameters are weighting coefficients which may be organized, or arranged to be organized, in a weighting matrix having N rows, one row for each transforming means, each row having M weighting coefficients. The weighting matrix is then optimised, or arranged to be optimised, by using the optimisation process over the instantaneous bandwidth B for maximizing the array processing gain of at least one array of at least two antenna elements/sub arrays. Each weighting coefficient in the N×M weighting matrix is defined as a parameter, M being a number corresponding to the number of spectral components.

The invention has been exemplified with the parameters affecting the waveforms being the weighting coefficients which are organized in the w-matrix or the W-matrix as explained above. The weighting coefficients can however be organized in any suitable way, e.g. as vectors or the transpose of the w- and the W-matrix meaning that columns and rows are switched, i.e. a weighting coefficient $w_{n,m}$ becomes $w_{m,n}$. In the examples presented each transforming means is using the same number of weighting coefficients. This is however not necessary, but the number of weighting coefficients can be optimized for each transforming means.

As the parameters, exemplified with weighting coefficients, can be organized in different ways the general feature of the optimisation process over the instantaneous bandwidth B is that the parameters are optimised, or arranged to be optimised, by using the optimisation process over the instantaneous bandwidth B for maximizing the array processing gain of at least one array of at least two antenna elements/sub arrays.

The cancellation directions in the direction of interference sources are then accomplished by:
the transforming means 100, 200, 150, $Tr_1$-$Tr_N$ being inserted, or arranged to be inserted, between at least all but one of the antenna elements and the sub arrays $E_1$-$E_N$ in the wideband antenna system and the electronic system 303, a sub array comprising at least two sub elements, or the transforming means being integrated in the antenna element/sub array or the electronic system and
the transforming means 100, 200, 150, $Tr_1$-$Tr_N$ affecting, or arranged to affect, the waveforms between at least all but one of the antenna elements and the sub arrays ($E_1$-$E_N$) and the electronic system 303 by use of the parameters obtained from the optimisation process over the instantaneous bandwidth B.

The parameters in the weighting matrix used to affect, or arranged to affect, the waveforms between antenna elements/sub arrays can thus be of two different types:
the weighting coefficients of a weighting matrix W obtained, or arranged to be obtained, from the optimisation process over the instantaneous bandwidth B for M spectral components for each of the transforming means, thus resulting in a W-matrix having M columns and N rows, N being equal to the number of antenna elements and sub arrays or
the weighting coefficients of a corresponding weighting matrix w obtained, or arranged to be obtained, from the optimisation process over the instantaneous bandwidth B in the time domain, each row being the Inverse Fourier transformation of the corresponding row in the W-matrix.

One example of optimisation of the $NAPG(w, \theta_{MB}, \phi_{MB})$ with transforming means with 16 weighting coefficients according to the "steepest ascent" method will now be presented. The $NAPG(w, \theta, \phi)$ is defined in equation (12).

$$NAPG(w, \theta, \varphi) = \frac{\frac{1}{N_{Tot}} \cdot \sum_{n=0}^{N-1}\sum_{n'=0}^{N-1}\sum_{m=0}^{M-1}\sum_{m'=0}^{M-1} w_{n',m'}^* \cdot w_{n,m} \cdot c_{Tx}[(m'-m)\cdot T + \tau_{n'}(\theta,\varphi) - \tau_n(\theta,\varphi)]}{\sum_{n=0}^{N-1}\sum_{n'=0}^{N-1}\sum_{m=0}^{M-1}\sum_{m'=0}^{M-1} w_{n',m'}^* \cdot w_{n,m} \cdot \left\{ \begin{array}{l} \delta_{n',n} \cdot c_{Rx}[(m'-m)\cdot T] + \sum_{j=0}^{J-1} \frac{\sigma_{J_j}^2}{\sigma_{Rx}^2} \cdot \\ c_{J_j}[(m'-m)\cdot T + \tau_{n'}(\theta_{J_j},\varphi_{J_j}) - \tau_n(\theta_{J_j},\varphi_{J_j})] \end{array} \right\}} \quad (12)$$

In the example to follow the normalized autocorrelation functions $c_{Tx}$, $c_{Rx}$, and $c_J$ all are assumed to correspond to rectangular "white" power spectrums with normalized autocorrelation functions according to equation (13) below:

$$c(\tau) = e^{-j \cdot 2 \cdot \pi \cdot f_c \cdot \tau} \cdot \sin c(\pi \cdot B \cdot \tau) \quad (13)$$

where: $\sin c(x) = \sin(x)/x$.

In $c_{Tx}$ and $c_{Rx}$ both $f_c$ and B are equal to the centre frequency and bandwidth of the wideband antenna system respectively. For the normalized autocorrelation functions of the jammers, $C_{J_j}$, the jammer centre frequencies and bandwidths has to be adjusted in such a way that only the portion of the jammer spectrum that falls within the antenna bandwidth is included in equation (13) for each jammer.

Figure 6:
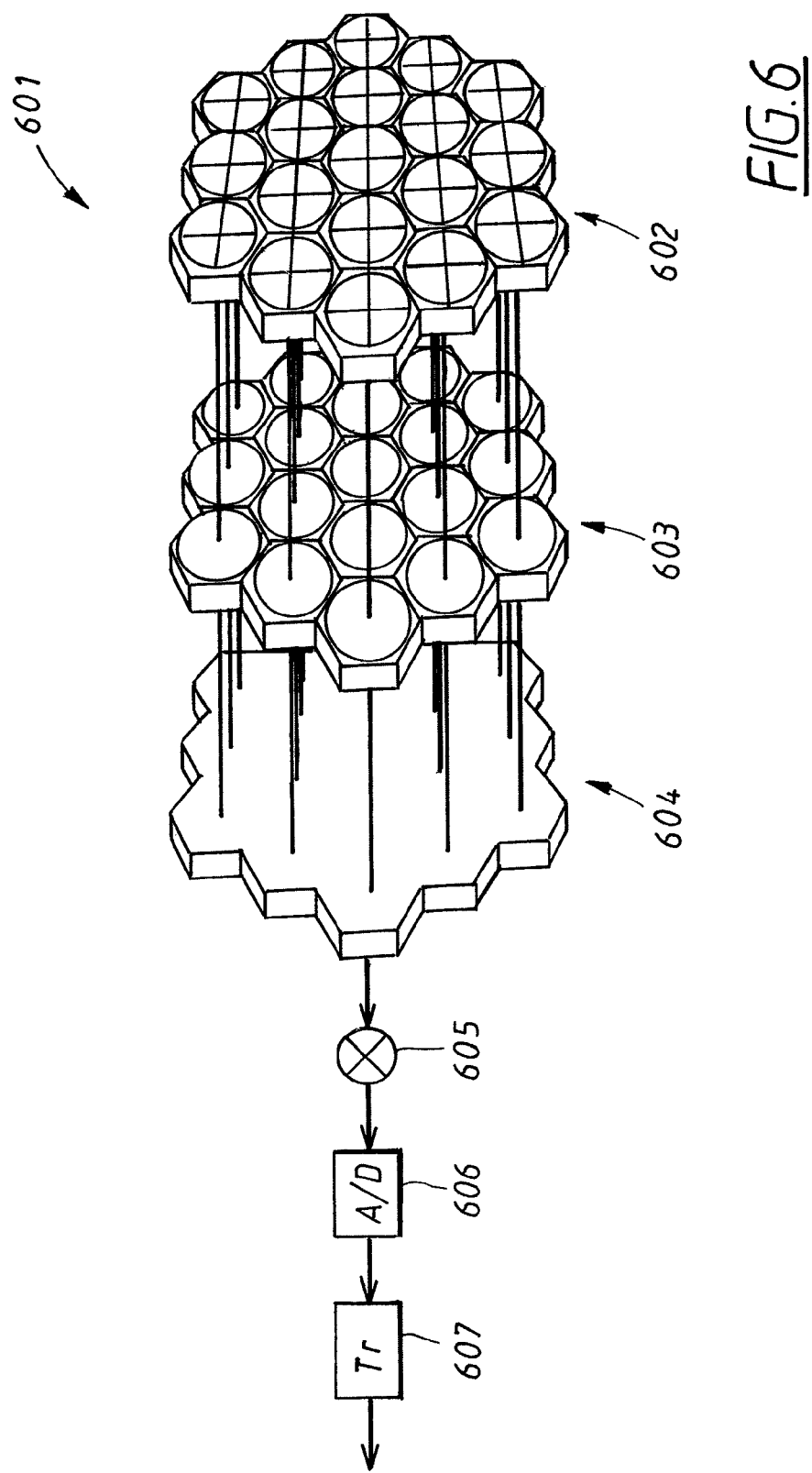
FIG. 6 schematically shows one antenna element composed of several sub elements, compare with $E_2$ in FIG. 3.
Figure 7:
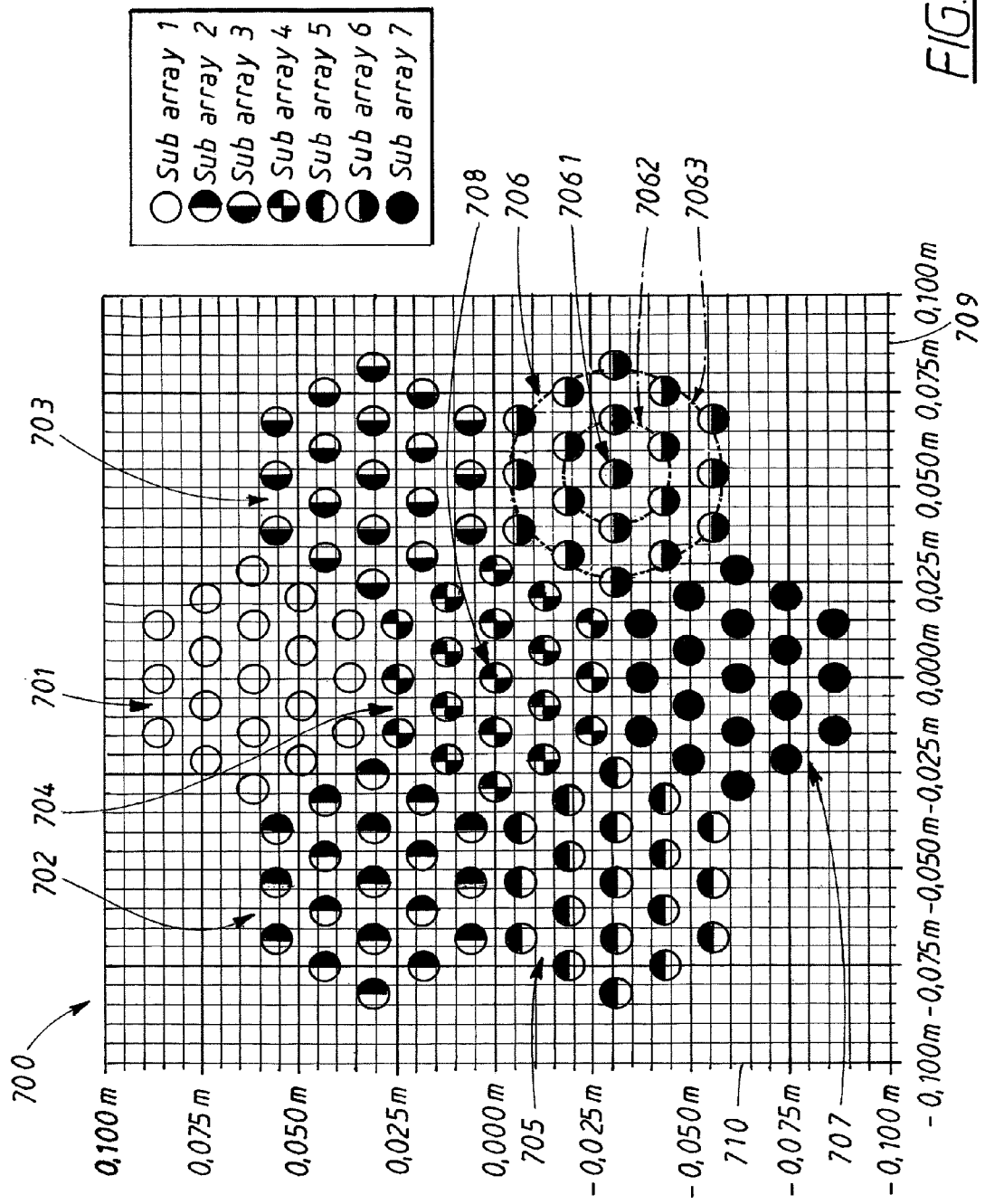
FIG. 7 schematically shows an example of a planar array composed of seven hexagonal antenna elements composed of nineteen sub elements each.

The jammer parameter estimation process will be described by an example with a 2-dimensional wideband array antenna. The solution model presented is however designed for use with 1-, 2- or 3-dimensional wideband array antennas. An example with a 2-dimensional wideband array antenna is chosen in order not to blur the presentation with more complex calculations. The invention can thus also be implemented both on a linear type of array antenna (1-dimensional) and a volume array antenna (3-dimensional). In the example with a 2-dimensional array antenna following input information is used:

Planar 2-dimensional wideband array antenna geometry
In this practical example the x- and z-axis are pointing towards the true horizon and the y-axis is pointing towards zenith
Seven hexagonal sub arrays equipped with nineteen antenna elements each, see FIG. 7. Each sub array is configured as described in association with FIG. 6.
Element separation: d=14,276 mm
Antenna element data
Antenna element main beam direction: $\hat{r}_{e_{MB}}=\hat{z}=(0\ 0\ 1)$
Antenna element power pattern: $EP(\hat{r}, \hat{r}_{e_{MB}}, f_{cw}) \approx \hat{r} \cdot \hat{z} = \cos(\phi)$
Wideband array antenna control
Main beam azimuth angle: $AZ_{MB}=30°$
Main beam elevation angle: $El_{MB}=0°$
Resulting main beam unit vector: $\hat{r}_{MB}=[0,500\ 0,000\ 0,866]$
True Time Delay is used for each element in each sub array.
Each sub array in the wideband array antenna is controlled by one transforming means according to FIG. 2b.
Transforming means
Number of weighting coefficients: M=16
Delay between weighting coefficients of the transforming means: T=1 ns
Receiver
Centre frequency: $f_{cR}=9.0$ GHz
Bandwidth: $B_R=1.0$ GHz
Waveform
White bandwidth limited Gaussian noise
Centre frequency: $f_{cw}=9.0$ GHz
Bandwidth: $B_w=1.0$ GHz
Jammer data
Number of jammers: J=3
Jammer number 1
White bandwidth limited Gaussian noise
Power normalised to the receiver noise level: $P_{J1}=20$ dB
Centre frequency: $f_{cJ1}=9.2$ GHz
Bandwidth: $B_{J1}=1.0$ GHz
Azimuth angle: $Az_{J1}=-30.0°$
Elevation angle: $El_{J1}=0.0°$
Resulting unit vector: $\hat{r}_{J_0}=[-0,500\ 0,000\ 0,866]$.
Observe the index; jammer no 1 has index number 0, and so on.
Jammer number 2
White bandwidth limited Gaussian noise
Power normalised to the receiver noise level: $P_{J2}=20$ dB
Centre frequency: $f_{cJ2}=9.0$ GHz
Bandwidth: $B_{J2}=1.0$ GHz
Azimuth angle: $Az_{J2}=0.0°$
Elevation angle: $El_{J2}=10.0°$
Resulting unit vector: $\hat{r}_{J_1}=[0,000\ 0,174\ 0,985]$
Jammer number 3
White bandwidth limited Gaussian noise
Power normalised to the receiver noise level: $P_{J3}=30$ dB
Centre frequency: $f_{cJ3}=8.8$ GHz
Bandwidth: $B_{J3}=1.0$ GHz
Azimuth angle: $Az_{J3}=60.0°$
Elevation angle: $El_{J3}=0.0°$
Resulting unit vector: $\hat{r}_{J_2}=[0,866\ 0,000\ 0,500]$ Where:
$\hat{r}$ Unit vector in the observation direction
$\hat{r}_{MB}$ Unit vector in the main beam direction
$\hat{r}_{e_{MB}}$ Unit vector in the main beam direction of element e
$\hat{r}_J$ Unit vector in the direction of jammer number j
The above designations are also used henceforth.

The sub arrays of this example, realized as an antenna aperture 601 comprising a sub array with 19 sub elements 602, is schematically shown in receive mode in FIG. 6.

In the receive mode a waveform is received by each antenna element 602, fed through a time/phase compensator 603 and combined in a power distributor/combinator 604 to one waveform entering an up/down converter 605. The output from the up/down converter is fed to an Analogue/Digital converter 606, the output of which is supplied to the transforming means, 607, which outputs I/Q samples of the output waveform $s_{out}$ (mT) to the electronic system ES.

I/Q-sampels, well known to the skilled person, are the in-phase and quadrature-phase components of a waveform s(t), referenced to a reference frequency, $f_r$. Mathematically this can be expressed as:

$$I=Re[s(t)\cdot e^{j\cdot 2\cdot \pi f_r}]$$

$$Q=Im[s(t)\cdot e^{j\cdot 2\cdot \pi f_r}]$$

In the example of FIG. 6, the transforming means is inserted between the electronic system ES and the sub array 601.

FIG. 7 shows the layout of the planar 2-dimensional wideband array antenna consisting of 7 sub arrays equipped with 19 sub elements each. The wideband array antenna 700 comprising an antenna aperture with 7 sub arrays 701-707, is shown schematically in FIG. 7. Each sub array is configured as the sub array 601 described in association with FIG. 6. X-axis, 709, and Y-axis, 710, show the distance from a centre 708 of a sub array 4, 704. The 19 sub elements of each sub array, here exemplified with sub array 6, 706, are located around a centre sub element 7061 having 6 sub elements in a first ring 7062 around the centre element and 12 sub elements in a second ring 7063. The distance between all neighbouring sub elements within a sub array is constant and the outer contour of the second ring is shaped as a hexagon. Sub array 1-3 and 5-7 are placed around sub array 4 so that each surrounding sub array has one side of the hexagon in parallel with one side of the hexagon of the sub array 4 and such that a line connecting the centres of neighbouring sub elements between the sub array 4 and each of the surrounding sub arrays is perpendicular to the parallel sides.

The example of FIG. 7 is calculated for the wideband array antenna 700 working in a frequency range 8.5 GHz to 9.5 GHz. The invention is however applicable to frequency ranges within the total electromagnetic spectrum and the applications for the invention are only limited by practical realization limits, such as sizes of components and antenna elements.

The example of FIG. 7 comprises a total number of elements equal to: 19·7=133 and is a relatively small antenna array. In many realisations the antenna array can comprise thousands of elements. The invention can also be implemented on these larger arrays and also of arrays of different shapes, as e.g. sub arrays shaped as rhombus, rhomboids, rectangles or squares.

Figure 8:
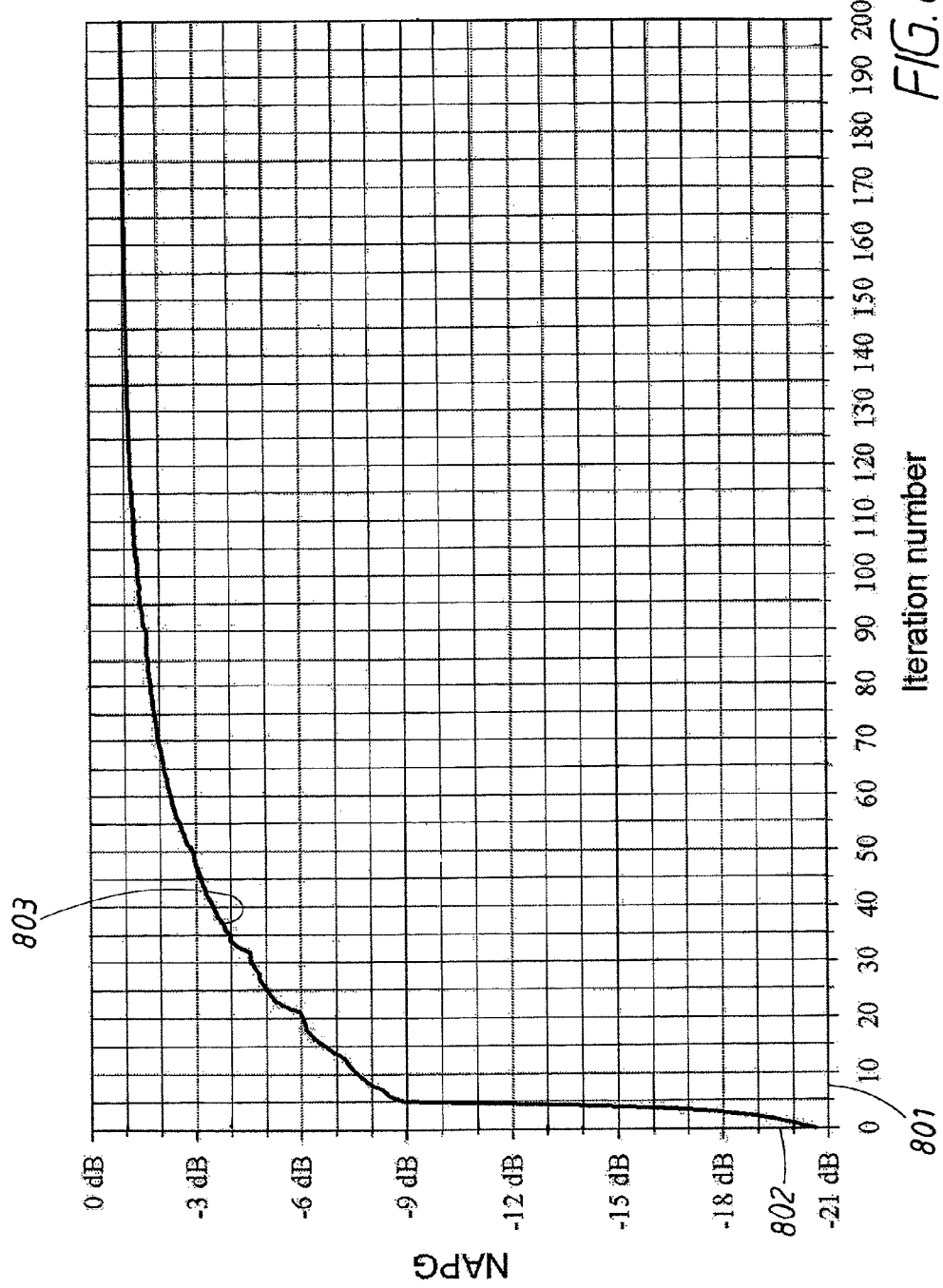
FIG. 8 shows a graph of the convergence of the Normalised Array Processing Gain (NAPG) in the main beam direction as a function of iteration steps.

The convergence of the iterative optimisation process over the instantaneous bandwidth B will now be explained. In this example all the 16 time domain weighting coefficients, $w_{n,m}$, for each of the transforming means, is initially chosen equal to (0 0 0 0 0 0 0 1 0 0 0 0 0 0 0 0) for all sub arrays (each row of the w-matrix is thus identical). Thereafter the steepest ascend method is used to maximise the NAPG by adjustment of the weighting coefficients of the transforming means in the direction of the steepest ascend. FIG. 8 shows the convergence of the NAPG as a function of iteration number. The number of iterations is shown on an X-axis 801 and the NAPG in dB is shown on an Y-axis 802 where 0 dB corresponds to $N_{Tot}$ as defined in association with equation (8). The NAPG value is shown with a graph 803. As can be seen from the graph the NAPG value is increasing rapidly during the first iterations. In this example the last 100 iterations gives relatively small improvements of the NAPG value.

As mentioned above, the NAPG includes the scan loss and is always less than 0 dB. In the example of FIG. 8 the main beam is scanned 30° off bore sight and the NAPG can thus not exceed)cos(30°)≈0,866 ⇔ −0,625 dB (10·log$_{10}$(0,866)=−0,625 dB). The bore sight is a direction perpendicular to the surface of the antenna aperture. After 200 iterations the NAPG is equal to −0,965 dB in this example, only −0,340 dB below the scan loss. During the iteration process the NAPG has improved almost 20 dB, resulting in a corresponding suppression of the jammers.

Scan loss in a planar (2-dimensional) array antenna, well known to the skilled person, occurs due to the reduced size of the aperture projection on a plane perpendicular to the main beam direction when the main beam is scanned off the aperture surface normal. This loss is normally proportional to the cosine of the angle between the aperture normal and the main beam direction.

The weighting coefficients of the transforming means, $w_{n,m}$, obtained after 200 iterations can now be used for plotting the NAPG as a function of observation direction expressed in uv-coordinates, u-coordinates on an X-axis 901 and v-coordinates on an Y-axis 902:

u=sin(φ)·cos(θ) and
v=sin(φ)·sin(θ).

Figure 9:
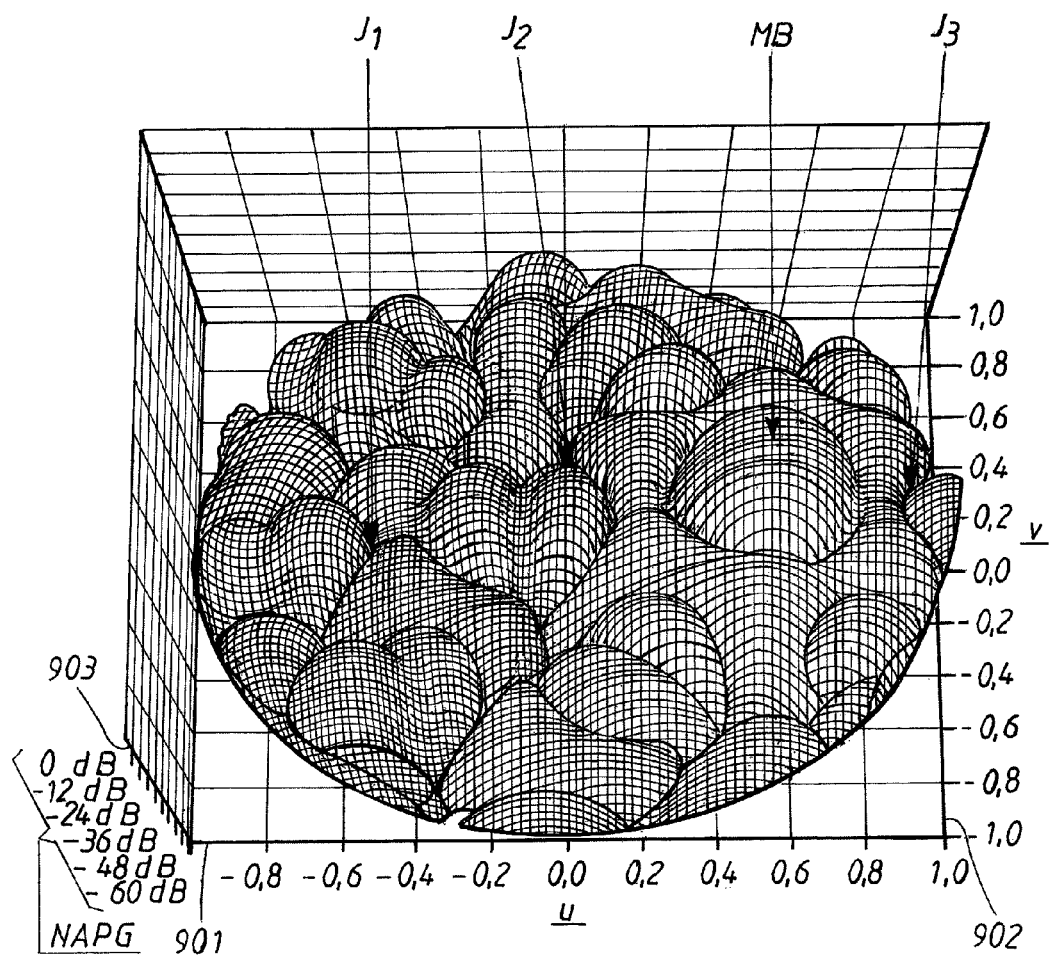
FIG. 9 shows the resulting Normalised Array Processing Gain (NAPG), after convergence, as a function of uv-coordinates.

The resulting Normalized Array Processing Gain is illustrated in three dimensions in FIG. 9 which shows the NAPG in dB, as defined in equation (8), on an Z-axis 903 as a function of observation directions after 200 iterations. The main beam direction is labelled "MB" and the jammer directions are labelled "J1", "J2" and "J3" respectively. As expected, the main beam direction coincides with the peak value of the NAPG and the jammers to very low values of the NAPG.

The optional estimation of interference source parameters will now be described. One example of how to perform the estimation will be described below in an evaluation process that is well suited for an automated application of the invention by being implemented as an algorithm on a computer. The evaluation process can however be implemented in other ways according to the principles of the invention described below, e.g. by a manual evaluation. The minimisation of the influence of interference sources is the basis for performing the optional estimation in the evaluation process. The minimisation of the influence of interference sources can however be performed without executing the estimation of interference parameters.

According to equation (2), the time domain weighting coefficients, $w_{n,0}$ to $w_{n,M-1}$ and the frequency domain coefficients, $W_{n,0}$, to $W_{n,M-1}$, forms a discrete Fourier transform pair for each antenna element n. Thus $W^{row(n)}$ equal to the DFT of $w^{row(n)}$ and $w^{row(n)}$ is equal to the IDFT of $W^{row(n)}$, see equation (14) and equation (15) below. The superscript row (n) stands for row number n of a weighting matrix comprising the weighting coefficients for all antenna elements. Each row in the weighting matrix thus comprises the M weighting coefficients for antenna element n.

$$W^{row(n)} = DFT[w^{row(n)}] \quad (14)$$

$$w^{row(n)} = IDFT[W^{row(n)}] \quad (15)$$

Consider an example with M time domain weighting coefficients in each transforming means. Use the time domain weighting coefficients obtained after convergence in the iterative process described in association with FIG. 5. These time domain weighting coefficients can now be transformed to M frequency domain weighting coefficients one for each transforming means according to equation (14). The first frequency domain coefficient (m=0) for each transforming means can now be used to calculate the narrowband array factor for the first spectral component. The calculation for the first spectral component is made according to equation (16) with f equal to the frequency of the first spectral component.

The second frequency domain coefficient for each transforming means can in a similar way be used to calculate the narrowband Antenna Pattern, AP, for the second spectral component, and so on. M Antenna Patterns, F(f,θ,φ), can thus be calculated for M spectral components (frequencies, j) evenly distributed over the instantaneous bandwidth B. Thus row n of the W-matrix is equal to the DFT of row n of the w-matrix and vice versa row n of the w-matrix is equal to the IDFT of row n of the W-matrix. The transforming means coefficients, $w_{n,m}$, obtained after 200 iterations can now be used to calculate the frequency domain weighting coefficients, $W_{n,m}$, by usage of a DFT for each sub array. When the W-matrix is known the Antenna Pattern (AP) can be estimated for any frequency with the aid of equation (16) below.

$$AP(f, \hat{r}) = \quad (16)$$

$$EP(\hat{r}, \hat{r}_{e_{MB}}, f_{cw}) \cdot \left\{ \frac{\left| \sum_{n=0}^{N-1} \left[ W_c(f, n) \cdot e^{j\frac{2\pi f}{c_0} \cdot r_n \cdot (\hat{r} - \hat{r}_{MB})} \cdot \sum_{n_e=0}^{N_e(n)-1} a_{n,n_e} \cdot e^{j\frac{2\pi f}{c_0} \cdot r_{n,n_e} \cdot (\hat{r} - \hat{r}_{MB})} \right] \right|^2}{\sum_{n=0}^{N-1} \left\| W_c(f, n) \cdot \sum_{n_e=0}^{N_e(n)-1} a_{n,n_e} \right\|} \right\}$$

$\hat{r}_n$ Is the vector from the antenna system phase centre (origo) to the phase centre of element n.

$r_{n,n_e}$ Is the vector from the phase centre of element n to the phase centre of sub element $n_e$.

$a_{n,n_e}$ Is a complex weighting coefficient within antenna element n for sub element $n_e$. Weighting between antenna elements are done by the coefficients, w.

n∈[0, 1 . . . (N−1)] Integer raising variable for antenna elements. N is equal to the number of antenna elements $n_e$∈[0, 1 . . . ($N_e$−1)] Integer raising variable for sub elements. $N_e$ is equal to the number of sub elements in each antenna element Where the frequency continuous sub array weights, $W_c$(f, n), see equation (17) are interpolated from the W-matrix according to the pages 31-35 in P.M. Woodward, Probability and Information Theory, with applications to Radar, Pergamon Press Ltd., London, England, 1953. The result can be expressed as indicated in equation (17) below.

$$W_c(f, n) = \sum_{m=0}^{2 \cdot M-1} W_{mod[m,M],n} \cdot \text{sinc}(\pi \cdot \{M \cdot [T \cdot (f - f_{cw}) + 1] - m\}) \quad (17)$$

With the aid of equations (16) and (17) it is possible to calculate the single frequency AP for arbitrarily frequencies, within the instantaneous bandwidth B, in arbitrarily directions.

Figure 10:
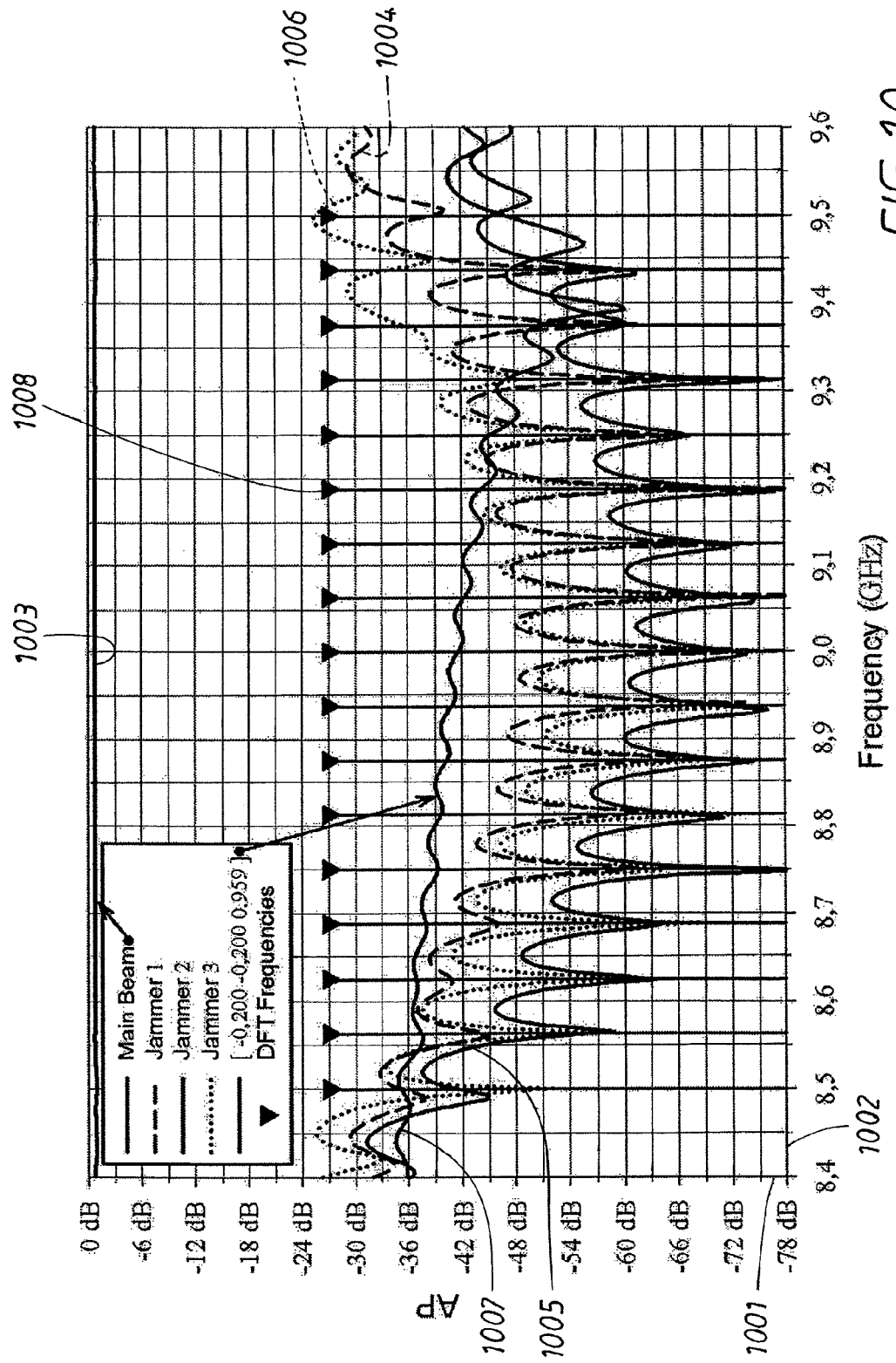
FIG. 10 shows the Antenna Pattern (AP) as a function of frequency for five different directions.

In FIG. 10 the Antenna Pattern, AP, according to equation (16) expressed in dB, is plotted on an Y-axis 1001 as a function of frequency on an X-axis 1002 for four different directions:

The main beam direction, 1003
The direction of jammer number 1, 1004
The direction of jammer number 2, 1005
The direction of jammer number 3, 1006
An arbitrarily chosen direction, 1007, with the unit vector equal to: [−0,200 −0,200 0,959]
All "DFT-frequencies" $f_m$ within the instantaneous bandwidth B of the waveform, $$f_m = f_c - \frac{B}{2} + m \cdot \frac{B}{M}$$

are marked by filled triangles, 1008, in FIG. 10. It is noticed that minima's within the instantaneous waveform bandwidth coincide with the "DFT-frequencies" in the jammer directions.

FIG. 10 reveals that deep, frequency stable, local minima for each DFT-frequency combined with low average level results after the iteration process in the jammers directions. This is in contrast to the arbitrarily chosen direction, 1007, with the unit vector equal to: [−0,200 −0,200 0,959]. This observation is used for an automated evaluation process of the invention which will now be described and is used to estimate the number of jammers and the direction to each of them. A frequency stable minima is a minima that remains in the same direction over at least a part of the instantaneous bandwidth B, such as at least 1%, preferably at least 5%, more preferably at least 25% and most preferably 50% of the instantaneous bandwidth B, but preferably not over the complete instantaneous bandwidth B such that the minima remains stable over not more than 90% of the instantaneous bandwidth B and preferably over not more than 80% of the instantaneous bandwidth B, and more preferably over not more than 70% of the instantaneous bandwidth B. The location of these minima can be made by manual means by comparing Antenna Patterns for at least each DFT frequency. It can also be made in an automated process included in an example which now will be described. In the example below it is assumed that each jammer occupies at least 50% of the instantaneous bandwidth B, which means that the minima shall remain stable over a portion of at least 50% of the instantaneous bandwidth B. However, depending on the application, the jammed portion of the instantaneous bandwidth B needed for defining the minima as frequency stable can be both above and below 50% of the instantaneous bandwidth B. The portion chosen depends on the desired accuracy accepted in the estimation of the number of jammers. A small portion increases the risk of over estimating the number of jammers and a big portion increases the risk of under estimating the number of jammers. The following procedure is used to estimate the number of jammers and the direction to each of them:

The Antenna Pattern, AP, is calculated for each DFT-frequency and for each frequency right between each pair of consecutive DFT-frequencies for all uv-coordinates in a quadratic grid with 401 points in the range from −1 to +1 along the u and v-axis respectively inside the unit circle where u=sin(φ)·cos(θ) and v=sin(φ)·sin(θ). θ, φ, u and v are defined in FIG. 4. The result from each grid point, (U, V) U∈0 . . . 400, V∈0..400, is stored in a vector $AP_{U,V}$ containing 2·M+1 values. Each value in the vector $AP_{U,V}$ corresponds to one of the above mentioned frequencies, numbered consecutively from 0 to 2·M.

In each of the above mentioned grid points the ratio in equation (18) is calculated for all combinations of $F_{low}$ and $F_{high}$, where $F_{low} \leq F_{high} - M/2$. This means that we have assumed that the portion the jammers occupy is at least 50% of the instantaneous bandwidth B, which means that the minima shall remain stable over a portion of at least 50% of the instantaneous bandwidth B. If we want to set the portion to 25% the inequality is changed to $F_{low} \leq F_{high} - M/4$. $F_{low}$ and $F_{high}$ represents frequency numbers ranging from 0 to 2·M, where all even numbers corresponds to a DFT-frequency.

$$R_{U,V}(F_{low}, F_{high}) = \left| \frac{\sum_{m=2 \cdot (F_{low}+1)-1}^{2 \cdot (F_{high}-1)+1} (-1)^m \cdot AP_{U,V_m}}{\sum_{m=F_{low}+1}^{F_{high}-1} AP_{U,V_{2 \cdot m}}} \right| \quad (18)$$

From FIG. 10 it is obvious that jammed directions are characterised by a ripple with a periodicity equal to the distance between the DFT-frequencies and by low values for each DFT-frequency. Equation 18 transforms presence of these properties into a high value on $R_{U,V}$ and a low value if these properties are not present. The characteristic periodicity is enhanced in the nominator by multiplying every second term in the summation with −1. The sum in the denominator, representing the average value for the DFT-frequencies between $F_{low}$ and $F_{high}$, is always low in jammed directions. Thus the ratio in equation 18 will result in a large value for jammed directions, or in the more general case interference direction, and considerably lower values in non-jammed directions, or non-interference directions in the more general case, making it easy to distinguish jammed directions from other directions.

The ratio $R_{U,V}$ is then compared with a threshold. The threshold is chosen to a suitable level related to the maximum value of $R_{U,V}(F_{low}, F_{high})$ for each combination of $F_{low}$ and $F_{high}$, fulfilling the above requirement, $F_{low} \leq F_{high} - M/2$. In this example the threshold is chosen equal to the greatest value of 2·M and 80% of the maximum value of $R_{U,V}(F_{low}, F_{high})$ for each combination of $F_{low}$ and $F_{high}$, fulfilling the above requirement, $F_{low} \leq F_{high} - M/2$.

The threshold is exceeded of the same jammer for many different combinations of $F_{low}$ and $F_{high}$. The one with the highest value of the product of the ratio $R_{U,V}$ and the bandwidth, equal to: $R_{U,V}|F_{high} - F_{low}|$, is selected.

Selected threshold crossings are tabulated in Table 1 below.

TABLE 1

| | Remaining threshold crossings | | | | | | |
|---|---|---|---|---|---|---|---|
| Crossing # | $R_{U,V}$ | $F_{low}$ | $F_{high}$ | U | V | u | v |
| 1 | 79.08 | 0 | 13 | 374 | 193 | 0.870 | −0.035 |
| 2 | 32.41 | 0 | 14 | 201 | 234 | 0.005 | 0.170 |
| 3 | 511.10 | 7 | 16 | 100 | 200 | −0.500 | 0.000 |

The Antenna Pattern, AP, according to equation (16) expressed in dB, is calculated for each DFT-frequency in the uv-directions given in Table 1, i.e. in the jammed directions or in the general case, the interference directions. The result is collected in Table 2 below.

TABLE 2

| Frequency | Main beam | Crossing # 1 | Crossing # 2 | Crossing # 3 |
|---|---|---|---|---|
| 8.5000 GHz | −0.8431 dB | −49.06 dB | −39.83 dB | −35.34 dB |
| 8.5625 GHz | −0.6330 dB | −59.47 dB | −59.29 dB | −44.47 dB |
| 8.6250 GHz | −0.6545 dB | −65.74 dB | −58.46 dB | −40.79 dB |
| 8.6875 GHz | −0.6352 dB | −60.18 dB | −67.08 dB | −45.96 dB |
| 8.7500 GHz | −0.6390 dB | −61.03 dB | −69.49 dB | −63.22 dB |
| 8.8125 GHz | −0.6376 dB | −60.73 dB | −65.22 dB | −60.91 dB |
| 8.8750 GHz | −0.6394 dB | −62.80 dB | −69.89 dB | −68.77 dB |
| 8.9375 GHz | −0.6423 dB | −64.82 dB | −68.34 dB | −67.51 dB |
| 9.0000 GHz | −0.6473 dB | −67.28 dB | −70.17 dB | −77.89 dB |
| 9.0625 GHz | −0.6557 dB | −76.15 dB | −71.43 dB | −73.50 dB |
| 9.1250 GHz | −0.6650 dB | −77.97 dB | −69.62 dB | −86.12 dB |
| 9.1875 GHz | −0.6801 dB | −66.77 dB | −73.43 dB | −78.07 dB |
| 9.2500 GHz | −0.6942 dB | −61.98 dB | −67.41 dB | −73.28 dB |
| 9.3125 GHz | −0.7095 dB | −51.36 dB | −74.67 dB | −73.90 dB |
| 9.3750 GHz | −0.6989 dB | −37.03 dB | −60.20 dB | −64.82 dB |
| 9.4375 GHz | −0.8514 dB | −33.40 dB | −57.68 dB | −66.51 dB |
| 9.5000 GHz | −0.8431 dB | −26.01 dB | −44.35 dB | −38.55 dB |

Table 2 shows the AP as a function of frequency in the directions of the threshold crossings listed in Table 1, tabulated for each DFT-frequency Cells in Table 2 representing jammer frequency combinations resulting in an attenuation greater than 50 dB are located within bold marked cells in the table. The same information is visulised in FIG. 11. The 50 dB threshold used in this example, could be chosen both higher or lower. A higher threshold, e.g. 60 dB, increases the probability of under estimating the bandwidth of the jammers and a lower threshold, e.g. 40 dB, increases the probability of over estimating the bandwidth of the jammers. Depending on the particular application and the balance between over and under estimating the bandwidth, the threshold level is typically selected within the range 25-70 dB. It should be observed when the jammer bandwidths are estimated, that the AP value at the maximum and minimum DFT-frequencies are unreliable due to the frequency folding associated with the Fourier-transform.

Figure 11:
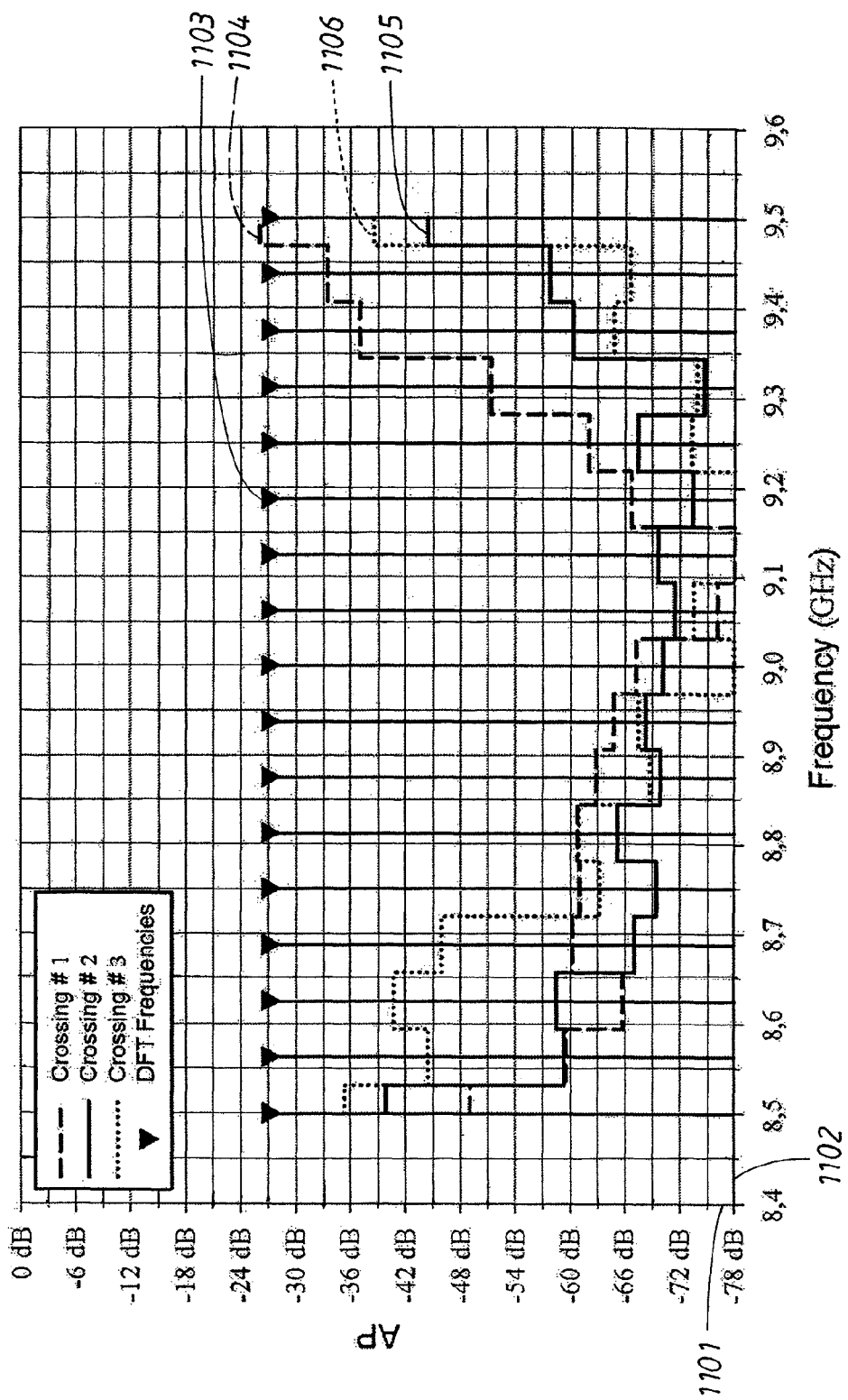
FIG. 11 schematically shows the Antenna Pattern (AP) for each DFT-frequency for the three largest threshold crossings.

FIG. 11 shows the AP, according to equation (16) expressed in dB, on an Y-axis 1101 as a function of frequency, on an X-axis 1102, in the jammer directions plotted for each frequency in the DFT. The DFT frequencies are marked with filled triangles 1103, crossing no. 1 is illusstrated with graph 1104, crossing no. 2 with graph 1105 and crossing no. 3 with graph 1106.

Now it is possible to estimate the parameters for each threshold crossing, the resulting estimates are tabulated in Table 3.

TABLE 3

| | Estimated parameters for each threshold crossing. | | | | | | | |
|---|---|---|---|---|---|---|---|---|
| # | $f_{min}$ (GHz) | $f_{max}$ (GHZ) | $f_c$ (GHz) | B (MHz) | u | v | Az | El |
| 1 | 8,5000-8,5625 | 9,3125-9,3750 | ~8.94 | ~812 | 0.870 | −0.035 | 60.5° | −2.0° |
| 2 | 8,5000-8,5625 | 9,4375-9,5000 | ~9.00 | ~937 | 0.005 | 0.170 | 0.3° | 9.8° |
| 3 | 8,6875-8,7500 | 9,4375-9,5000 | ~9.09 | ~750 | −0.500 | 0.000 | −30.0° | 0.0° |

Az is the Azimuth angle and El is the elevation angle.

$f_{max}$ is the frequency span between the highest DFT-frequency with an attenuation higher than 50 dB and the following DFT-frequency $f_{min}$ is the frequency span between the lowest DFT-frequency with an attenuation higher than 50 dB and the previous DFT-frequency The example of an evaluation process for estimating the interference source parameters described above is one example of how the evaluation process can be achieved in an example well suited for automation. The evaluation process can however be made in different ways including other automated evaluation processes than the one described above, or other more or less automated evaluation processes, including also a completely manual evaluation, as long as following general steps, for the evaluation process of the invention are included for achieving estimation of interference source parameters:

estimation of Antenna Patterns, AP:s, for at least the frequencies corresponding to the M spectral components,
  locating frequency stable minima in the Antenna Patterns, AP:s, giving the number of interference sources and the direction to these sources and
  evaluating attenuation of the Antenna Patterns, AP:s, as a function of frequency in the frequency stable minima directions, giving the bandwidth of the interference sources.

The invention also includes an arrangement for the three general steps mentioned above, for achieving estimation of interference source parameters comprising means for performing an evaluation process to:

estimate an Antenna Patterns, AP:s, for at least the frequencies corresponding to the M spectral components,
  locate frequency stable minima in the Antenna Patterns, AP:s, giving the number of interference sources and the direction to these sources and
  evaluate attenuation of the Antenna Patterns, AP:s, as a function of frequency in the frequency stable minima directions, giving the bandwidth of the interference sources.

In the evaluation process above the estimation of interference parameters has been illustrated in the time domain using the w-matrix and with the uv-coordinate system. The invention can however also be realized in the frequency domain using the W-matrix and with any suitable coordinate system.

In the general case using an arbitrary coordinate system and when working in the time- or frequency domain the evaluation process of the invention can be described in more detail as follows:

- the Antenna Pattern, AP, is estimated, or arranged to be estimated, for each of the frequencies corresponding to the M spectral components and for each frequency right between each pair of consecutive such frequencies for all directions of interest,
- for each direction of interest a ratio R is calculated, or arranged to be calculated, having a high value for interference directions and considerably lower values in non-interference directions,
- the ratio R is compared, or arranged to be compared, with a threshold, chosen to a suitable level related to the maximum value of the ratio R
- the number of crossings of the ratio R defines the number of interference sources,
- the direction to the interference source/s is defined by the direction/s corresponding to the crossing/s,
- the Antenna Pattern, AP, is calculated, or arranged to be calculated, for each of the frequencies corresponding to the M spectral components in the directions of the crossings and
- the bandwidth of the interference source is given by evaluating, or by means for evaluating, the Antenna pattern, AP, in the direction of the crossings as a function of frequency.

In this general case the ratio $R_{U,V}$ is exchanged to the ratio R being independent of the selected coordinate system. The ratio R is calculated for each direction of interest according to:

$$R(F_{low}, F_{high}) = \left| \frac{\sum_{m=2\cdot(F_{low}+1)-1}^{2\cdot(F_{high}-1)+1} (-1)^m \cdot AP_m}{\sum_{m=F_{low}+1}^{F_{high}-1} AP_{2\cdot m}} \right|$$

If the estimates in Table 3 are compared with the assumptions and input values used in our example it is obvious that:
Threshold crossing #1 corresponds to Jammer number 3
Threshold crossing #2 corresponds to Jammer number 2
Threshold crossing #3 corresponds to Jammer number 1

With this observation it is possible to compare the jammer input values with the estimates. This comparison between jammer assumptions and estimates are summarised in Table 4 below.

TABLE 4

Comparison between jammer assumptions and estimates

| Parameter | | Jammer number 1 | Jammer number 2 | Jammer number 3 |
|---|---|---|---|---|
| Centre frequency | Input value[1] | 9.10 GHz | 9.00 GHz | 8.90 GHz |
| | Estimation | 9.09 GHz | 9.00 GHz | 8.94 GHz |
| | Error | 10 MHz | 0 MHz | 40 MHz |
| Bandwidth | Input value[2] | 800 MHz | 1000 MHz | 800 MHz |
| | Estimation | 750 MHz | 937 MHz | 812 MHz |
| | Error | 50 MHz | 63 MHz | 12 MHz |
| Azimuth angle | Input value | −30.0° | 0.0° | 60.0° |
| | Estimation | −30.0° | 0.3° | 60.5° |
| | Error | 0.0° | 0.3° | 0.5° |

TABLE 4-continued

Comparison between jammer assumptions and estimates

| Parameter | | Jammer number 1 | Jammer number 2 | Jammer number 3 |
|---|---|---|---|---|
| Elevation angle | Input value | 0.0° | 10.0° | 0.0° |
| | Estimation | 0.0° | 9.8° | −2.0° |
| | Error | 0.0° | 0.2° | 2.0° |

[1]Jammer spectrum centre frequency within the receiver bandwidth, equal to the centre frequency of: $(\{[f_{cR} - B_R/2 \ldots f_{cR} + B_R/2] \cap [f_{cJ} - B_J/2 \ldots f_{cJ} + B_J/2]\})$ where $\cap$ represents intersection.
[2]Jammer spectrum bandwidth within the receiver bandwidth, equal to the bandwidth of: $(\{[f_{cR} - B_R/2 \ldots f_{cR} + B_R/2] \cap [f_{cJ} - B_J/2 \ldots f_{cJ} + B_J/2]\})$ where $\cap$ represents intersection.

Based only on the weighting coefficients obtained after convergence we have drawn the following conclusions:
There are three jammers
The azimuth directions to the jammers are approximately −30°, 0°, and 60° respectively
The bandwidth of the jammers are estimated to:
Approximately 8.6 GHz to at least 9.5 GHz for the jammer in the direction close to −30°
At least from 8.5 GHz to at least 9.5 GHz for the jammer in the direction close to 0°
At least 8.5 GHz to approximately 9.4 GHz for the jammer in the direction close to 60°.

An advantage with the evaluation process of the invention is that the time available for the actual function of the electronic system is not limited as the evaluation process for estimating the interference parameters will not occupy the antenna aperture of the electronic system during operation. The estimation of interference parameters is accomplished by just using the same parameters affecting the waveforms as used for minimising the interference. The estimation of interference parameters does thus not cause interruption of neither the normal function of the electronic system nor the normal ESM function. This is advantageous as antenna availability is a critical factor in Multifunctional systems where an antenna aperture can be used by several systems as e.g. a radar system, ESM system and a communication system.

FIG. 12 schematically shows a block diagram of one example of how the invention can be implemented including also the estimation of the jammer parameters. FIG. 12 shows the situation when the wideband array antenna 1201 is working in receive mode. The wideband array antenna can optionally comprise one or several sub-arrays, each sub-array comprising at least two sub elements, e. There are a total of N antenna elements, $E_1$ to $E_N$, and in this example a corresponding number of transforming means $Tr_1$ to $Tr_N$. An antenna element can also be a sub array. One transforming means is, in this example, inserted between each antenna element or sub array and the electronic system ES, 1203, which e.g. can be a radar system, an ESM system or a communication system. $Tr_1$ is inserted between $E_1$ and the electronic system, $Tr_2$ between $E_2$ and the electronic system and so on until $Tr_N$ being inserted between $E_N$ and the electronic system ES, i.e. $Tr_n$ is inserted between corresponding antenna element or sub array $E_n$ and the electronic system ES. A wideband array antenna unit is defined as the wideband array antenna and the transforming means. In FIG. 12, $E_2$ is a sub array comprising three sub elements e. The input waveform in FIG. 12, $s_{in}(t)$ or $s_{in}(m \cdot T)$, 1206, is emitted from each antenna element or sub array and fed to the corresponding transforming means. The output waveform $s_{out}(t)$ or $s_{out}(m \cdot T)$, 1207, is fed to the electronic system 1203. The waveforms 1206 and 1207 are individual for each antenna element or sub array. The parameters affecting the waveforms can be generated in the ES and then fed to the transforming means or the generation of the parameters can be performed in the transforming means. In this example the generation of the parameters is performed in the ES and fed via an input connection 1208 to the transforming means and a separate Jammer, RFI, Clutter module, JRC, 1210. In this example the JRC module is thus arranged to receive an input, via the input connection 1208, comprising the parameters affecting the waveforms from the electronic system ES, 1203. In other realization this input information to the JRC module can be arranged to be received from the transforming means via a separate connection to the transforming means in case the generation of the parameters is performed in the transforming means. The parameters arranged to affect the waveforms can comprise the weighting coefficients in the w-matrix or the W-matrix. The JRC-module comprises means for performing the evaluation process for estimating the interference parameters and the JRC module is arranged to output the result of the estimation via an output connection 1209 to the electronic system, ES. In this example the complete w-matrix or the complete W-matrix is transferred to all transforming means and the JRC-module. The transforming means are then only using the row of the matrix applicable for the antenna element to which it is connected. In another realization each transforming means only receives the row of the w-matrix or the W-matrix from the electronic system ES applicable to the antenna element or sub array to which the transforming means is connected. The JRC-module, however, always receives the complete w-matrix or the complete W-matrix, these matrixes being examples of parameters affecting the waveforms. However as mentioned earlier the weighting coefficients can be organized in any suitable way, e.g. as vectors or the transpose of the w- and the W-matrix meaning that columns and rows are switched, i.e. a weighting coefficient $w_{n,m}$ becomes $w_{m,n}$. Each transforming means does not either need to use the same number of weighting coefficients, as described. The JRC-module always receives the complete set of parameters affecting the waveforms.

The JRC-module can also be incorporated in the electronic system ES or any computer available on a platform supporting the ES or connected to the platform via suitable communication facilities. The parameters affecting the waveforms are thus used for three purposes:
- to maintain the main beam in the selected direction as the parameters affecting the waveforms are based on a defined main beam direction
- to create wideband cancellation directions in the direction of interference sources by the transforming means affecting the waveforms with the parameters obtained in the optimisation process over the instantaneous bandwidth B
- to estimate interference parameters by means of an evaluation process based on the parameters obtained in the optimisation process over the instantaneous bandwidth B.

The invention is not limited to the embodiments and examples described above, but may vary freely within the scope of the amended claims.

An example of this is a variation of the embodiment described in FIG. 1a. In the embodiment described in FIG. 1a the transforming means is inserted between each antenna element and the electronic system. A variation of this solution within the scope of the invention is that a common IFT unit is used for all antenna elements/sub arrays, i.e. the waveform from each antenna element/sub array is processed in a separate FT unit for each antenna element/sub array but the sum of the spectral component m from each antenna element/sub array after suitable time delay or phase shift and/or attenuation/amplification are processed in a common IFT unit.

The invention claimed is:

1. A method to minimise an influence of interference sources by control of a Signal to Noise/interference Ratio of a wideband antenna system connected to an electronic system and comprising at least one array of at least two antenna elements/sub arrays, the signal to noise interference ratio control comprising
   establishing of cancellation directions for interfering frequencies in the antenna pattern in the direction of interference sources, the signal to noise interference ratio control being achieved by affecting waveforms between the antenna elements and the electronic system with phase shifts or time delays obtained from an optimisation process for maximising the array processing gain of said array, wherein the wideband antenna system is operational over a system bandwidth and operating with an instantaneous bandwidth, and wherein the cancellation directions in the direction of the interference sources over the instantaneous bandwidth B, are accomplished by:
   a transforming module inserted between at least all but one of the antenna elements and the sub arrays in the wideband antenna system and the electronic system, a sub array comprising at least two sub elements, or the transforming module being integrated in the antenna element/sub array or the electronic system,
   parameters, being optimised by using the optimisation process over the instantaneous bandwidth for maximizing the array processing gain of said array, and
   the transforming module affecting the waveforms between at least all but one of the antenna elements and the sub arrays and the electronic system by use of the parameters obtained from the optimisation process over the instantaneous bandwidth.

2. The method according to claim 1, wherein the parameters are weighting coefficients being organized in a weighting matrix comprising N rows, one row for each transforming module, each row having M weighting coefficients, and that the weighting matrix is optimised by using the optimisation process over the instantaneous bandwidth for maximizing the array processing gain of said array, each weighting coefficient in the N×M weighting matrix being defined as a parameter, M being a number corresponding to the number of spectral components.

3. The method according to claim 1, wherein the wideband antenna system comprises:
   a wideband array antenna having an array of at least two antenna elements/sub arrays or
   a main antenna and an wideband auxiliary antenna, the auxiliary wideband antenna being a single antenna element or an array of antenna elements/sub arrays.

4. The method according to claim 1, wherein the transforming module is inserted between all of the antenna elements or sub arrays in the wideband array antenna and the electronic system and between all of the antenna elements or sub arrays in the wideband auxiliary antenna and the electronic system, or the transforming module being integrated in the antenna element/sub arrays or in the electronic system.

5. The method according to claim 1, the parameters in the weighting matrix used to affect the waveforms between antenna elements/sub arrays are:
   the weighting coefficients of a weighting matrix W obtained from the optimisation process over the instantaneous bandwidth B for M spectral components for each of the transforming module, thus resulting in a W-matrix having M columns and N rows, N being equal to the number of antenna elements and sub arrays or the weighting coefficients of a corresponding weighting matrix w obtained from the optimisation process over the instantaneous bandwidth B in the time domain, each row being the Inverse Fourier transformation of the corresponding row in the W-matrix.

6. The method according to claim 1, wherein the optimisation process over the instantaneous bandwidth B is estimating the w-matrix resulting in the maximum Normalized Array Processing Gain for a known Main Beam direction, $NAPG_{MB}$, for the wideband array antenna or the wideband auxiliary antenna combined with a main antenna.

7. The method according to claim 1, wherein estimation of interference source parameters is achieved in an evaluation process by:
- estimation of Antenna Patterns AP for at least the frequencies corresponding to the M spectral components,
- locating frequency stable minima in the Antenna Patterns giving the number of interference sources and the direction to these sources and
- evaluating attenuation of the Antenna Patterns as a function of frequency in the frequency stable minima directions, giving the bandwidth of the interference sources.

8. The method according to claim 7, wherein
- the Antenna Pattern is estimated for each of the frequencies corresponding to the M spectral components and for each frequency right between each pair of consecutive such frequencies for all directions of interest,
- for each direction of interest a ratio R is calculated, having a high value for interference directions and considerably lower values in non-interference directions,
- the ratio R is compared with a threshold, chosen to a suitable level related to the maximum value of the ratio R
- the number of crossings of the ratio R defines the number of interference sources,
- the direction to the interference source/s is defined by the direction/s corresponding to the crossing/s,
- the Antenna Pattern is calculated for each of the frequencies corresponding to the M spectral components in the directions of the crossings and
- the bandwidth of the interference source is given by evaluating the Antenna pattern in the direction of the crossings as a function of frequency.

9. The method according to claim 7, wherein the ratio R is calculated for each direction of interest, according to:

$$R(F_{low}, F_{high}) = \left| \frac{\sum_{m=2 \cdot (F_{low}+1)-1}^{2 \cdot (F_{high}-1)+1} (-1)^m \cdot AP_m}{\sum_{m=F_{low}+1}^{F_{high}-1} AP_{2 \cdot m}} \right|.$$

10. A wideband antenna system arranged to minimise an influence of interference sources by an arrangement to control the Signal to Noise/interference Ratio of the wideband antenna system connected to an electronic system and comprising at least one array of at least two antenna elements/sub arrays, the signal to noise/interference control comprises means for establishing of cancellation directions for interfering frequencies in the antenna pattern in the direction of interference sources, the signal to noise/interference control being arranged to be achieved by affecting waveforms between the antenna elements and the electronic system with phase shifts or time delays obtained from an optimisation process for maximising the array processing gain of said array, wherein the wideband antenna system being arranged to be operational over a system bandwidth and arranged to operate with an instantaneous bandwidth and wherein the cancellation directions in the direction of the interference sources over the instantaneous bandwidth B, are arranged to be accomplished by:
- a transforming module arranged to be inserted between at least all but one of the antenna elements and the sub arrays in the wideband antenna system and the electronic system, a sub array comprising at least two sub elements, or the transforming module being integrated in the antenna element/sub array or the electronic system,
- parameters, being arranged to be optimised by using the optimisation process over the instantaneous bandwidth for maximizing the array processing gain of said array, and
- the transforming module being arranged to affect the waveforms between at least all but one of the antenna elements and the sub arrays and the electronic system by use of the parameters obtained from the optimisation process over the instantaneous bandwidth.

11. The wideband antenna system according to claim 7, wherein the parameters are weighting coefficients being arranged to be organized in a weighting matrix comprising N rows, one row for each transforming module, each row having M weighting coefficients, and wherein the weighting matrix is arranged to be optimised by using the optimisation process over the instantaneous bandwidth for maximizing the array processing gain of said array, each weighting coefficient in the N×M weighting matrix being defined as a parameter, M being a number corresponding to the number of spectral components.

12. The wideband antenna system according to claim 10, further comprising:
- a wideband array antenna having an array of at least two antenna elements/sub arrays or
- a main antenna and an a wideband auxiliary antenna, the auxiliary wideband antenna being a single antenna element or an array of antenna elements/sub arrays.

13. The wideband antenna system according to claim 10, wherein the transforming module is arranged to be inserted between all of the antenna elements or sub arrays in the wideband array antenna and the electronic system and between all of the antenna elements or sub arrays in the wideband auxiliary antenna and the electronic system or the transforming module is arranged to be integrated in the antenna element/sub arrays or in the electronic system.

14. The wideband antenna system according to claim 10, wherein the parameters in the weighting matrix arranged to affect the waveforms between antenna elements/sub arrays are:
- the weighting coefficients of a weighting matrix W arranged to be obtained from the optimisation process over the instantaneous bandwidth B for M spectral components for each of the transforming module, thus resulting in a W-matrix having M columns and N rows, N being equal to the number of antenna elements and sub arrays or
- the weighting coefficients of a corresponding weighting matrix w arranged to be obtained from the optimisation process over the instantaneous bandwidth B in the time domain, each row being the Inverse Fourier transformation of the corresponding row in the W-matrix.

15. The wideband antenna system according to claim 10, wherein the optimisation process over the instantaneous bandwidth is arranged to estimate the w-matrix resulting in the maximum Normalized Array Processing Gain for a known Main Beam direction, $NAPG_{MB}$, for the wideband array antenna or the wideband auxiliary antenna combined with a main antenna.

16. The wideband antenna system according claim 10, wherein an arrangement for achieving estimation of interference source parameters comprises an evaluation module configured to carry out an evaluation process to:
   estimate Antenna Patterns AP for at least the frequencies corresponding to the M spectral components,
   locate frequency stable minima in the Antenna Patterns giving the number of interference sources and the direction to these sources and
   evaluate attenuation of the Antenna Patterns as a function of frequency in the frequency stable minima directions, giving the bandwidth of the interference sources.

17. The wideband antenna system according to claim 10, wherein a JRC module is arranged to receive an input comprising the parameters affecting the waveforms via an input connection from the electronic system or via a separate connection to the transforming module, the JRC module comprising means for performing the evaluation process for estimating the interference parameters and the JRC module is arranged to output the result of the estimation via an output connection to the electronic system.

18. The wideband antenna system according to claim 17, wherein the parameters arranged to affect the waveforms comprises the weighting coefficients in the w-matrix or the W-matrix.

19. The wideband antenna system according to claim 17, wherein the JRC-module is incorporated in the electronic system, or any computer available on a platform supporting the electronic system or connected to the platform via suitable communication facilities.

* * * * *